(12) United States Patent
Otsuki et al.

(10) Patent No.: US 8,392,233 B2
(45) Date of Patent: Mar. 5, 2013

(54) ROLLING STOCK SCHEDULING APPARATUS AND METHOD

(75) Inventors: Tomoshi Otsuki, Yokohama (JP); Hideyuki Aisu, Kawasaki (JP)

(73) Assignee: Kabushiki Kaisha Toshiba, Minato-ku, Tokyo (JP)

( * ) Notice: Subject to any disclaimer, the term of this patent is extended or adjusted under 35 U.S.C. 154(b) by 1003 days.

(21) Appl. No.: 12/259,803

(22) Filed: Oct. 28, 2008

(65) Prior Publication Data

US 2009/0119145 A1    May 7, 2009

(30) Foreign Application Priority Data

Oct. 29, 2007   (JP) .................................. 2007-280765

(51) Int. Cl.
*G06Q 10/00* (2012.01)
(52) U.S. Cl. ........................................................ 705/7.12
(58) Field of Classification Search .................. 705/7.12
See application file for complete search history.

(56) References Cited

U.S. PATENT DOCUMENTS

| | | | | |
|---|---|---|---|---|
| 4,122,523 A * | 10/1978 | Morse et al. | ................... | 701/117 |
| 5,438,517 A * | 8/1995 | Sennott et al. | ............... | 701/213 |
| 5,448,485 A * | 9/1995 | Ishibashi et al. | .............. | 701/200 |
| 5,845,227 A * | 12/1998 | Peterson | ....................... | 701/209 |
| 6,070,124 A * | 5/2000 | Nimura et al. | ................. | 701/211 |
| 6,240,439 B1 * | 5/2001 | Hasegawa et al. | ............ | 718/100 |
| 6,636,800 B1 * | 10/2003 | Lauther et al. | ................ | 701/202 |
| 7,146,000 B2 * | 12/2006 | Hollman et al. | ......... | 379/221.06 |
| 7,363,126 B1 * | 4/2008 | Zhong et al. | .................... | 701/25 |
| 7,454,442 B2 * | 11/2008 | Cobleigh et al. | ....................... | 1/1 |
| 7,957,871 B1 * | 6/2011 | Echeruo | .......................... | 701/54 |

(Continued)

FOREIGN PATENT DOCUMENTS

| | | |
|---|---|---|
| JP | 9-297791 A | 11/1997 |
| JP | 2000-071988 | 3/2000 |

(Continued)

OTHER PUBLICATIONS

Joborn, Martin, Crainic, Teodor Gabriel, Gendreau, Michel, Holmberg, Kaj, and Lundgren, Jan T., "Economies of Scale in Empty Freight Car Distribution in Scheduled Railways," Transportation Science, May 2004, pp. 121-134.*

(Continued)

*Primary Examiner* — Nathan Erb
(74) *Attorney, Agent, or Firm* — Ohlandt, Greeley, Ruggiero & Perle, L.L.P.

(57) ABSTRACT

A rolling-stock-scheduling apparatus includes a creation unit creating a graph from an initial day to a target day, the graph including nodes representing initial-day sites, target-day sites, and first operations, the first operations being defined by a departure time, a departure site, an arrival time, and an arrival site, the graph including arcs each of which indicates nodes' connectability, a setting unit setting paths that connect second operations on each day from the initial day to the target day, an exchange unit exchanging, if there is a first car which does not exist at the target-day site on the target day, each arc so that all the cars exist at target-day sites on the target day, and an output unit outputting, if second paths on which all the cars exist at the target-day sites are found, third operations corresponding to each of the second paths as a car-operation.

6 Claims, 27 Drawing Sheets

U.S. PATENT DOCUMENTS

| | | | |
|---|---|---|---|
| 2003/0014286 A1* | 1/2003 | Cappellini | 705/5 |
| 2003/0045999 A1* | 3/2003 | Joerg et al. | 701/209 |
| 2005/0261946 A1* | 11/2005 | Howlett et al. | 705/8 |
| 2007/0021998 A1* | 1/2007 | Laithwaite et al. | 705/9 |

FOREIGN PATENT DOCUMENTS

JP 2003-154939 A 5/2003

OTHER PUBLICATIONS

Lindner, Thomas, and Zimmerman, Uwe T., "Cost Optimal Periodic Train Scheduling," Math. Meth. Oper. Res., 2005, pp. 281-295.*

Liu, Jian, Solving Real-Life Transportation Scheduling Problems, University of Florida, 2003.*

Sammarra, Marcello, Cordeau, Jean-Francois, Laporte, Gilbert, and Monaco, M. Flavia, "A Tabu Search Heuristic for the Quay Crane Scheduling Problem," J. Sched., Aug. 15, 2007, pp. 327-336.*

Alfieri, Arianna, Groot, Rutger, Kroon, Leo, and Schrijver, Alexander, "Efficient Circulation of Railway Rolling Stock," Transportation Science, Aug. 2006, 40, 3, pp. 378-391.*

Planning System Laboratory of Railway Technical Research Institute, Railway Scheduling Algorithm, Dec. 26, 2005, pp. 68-95 (author: Tomii; translated title: Development of Vehicle Operation Plan; includes English translation).*

Sahin, Guvenc, New Combinatorial Approaches for Solving Railroad Planning and Scheduling Problems, University of Florida, 2006.*

Planning System Laboratory of Railway Technical Research Institute, "*Railway Scheduling Algorithm*", Dec. 26, 2005, pp. 68-95 (untranslated).

"A Search-based Approach to the Railway Rolling Stock Allocation Problem" by Otsuki et al., from the proceedings of the 4th International Conference on Combinatorial Optimization and Applications (COCOA), vol. II, pp. 131-143, Dec. 2010.

Japanese Office Action dated Mar. 6, 2012 from JP 2007-280765.

* cited by examiner

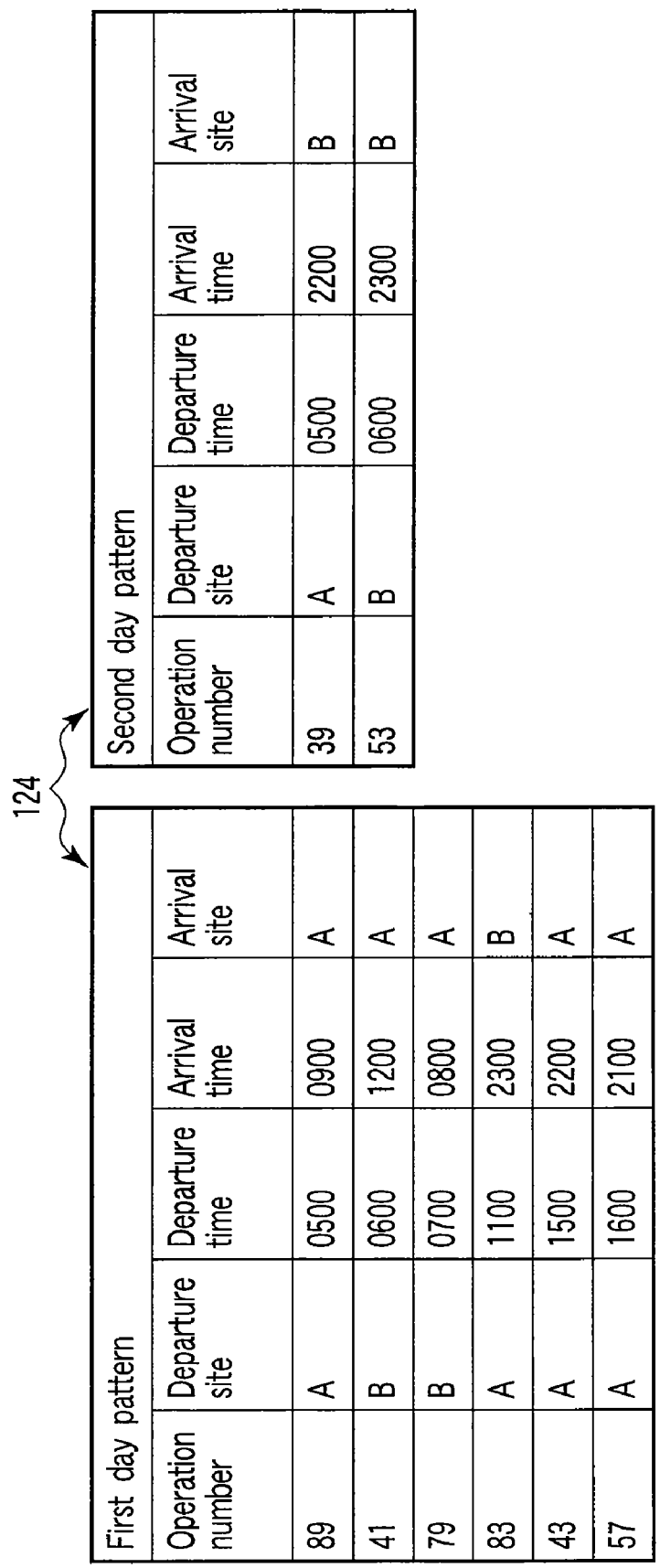
F I G. 4

Operation limiting constraints
· Operation 57 cannot be assigned to first day of car 1
· Only operation 23 is assignable to car 4
· Car 6 can be assigned A reserve but no operation from second day to 10th day     ~125

FIG. 5

Notations associated with day and car

| Departure site | Operation number |
|---|---|

114

| Car name | April 1, FRI | | April 2, SAT | | ... |
|---|---|---|---|---|---|
| 1 | A | 89,83 | B | A53 | |
| 2 | B | 41,43 | A | A extra | |
| 3 | B | 79,57 | A | 39 | |

FIG. 6

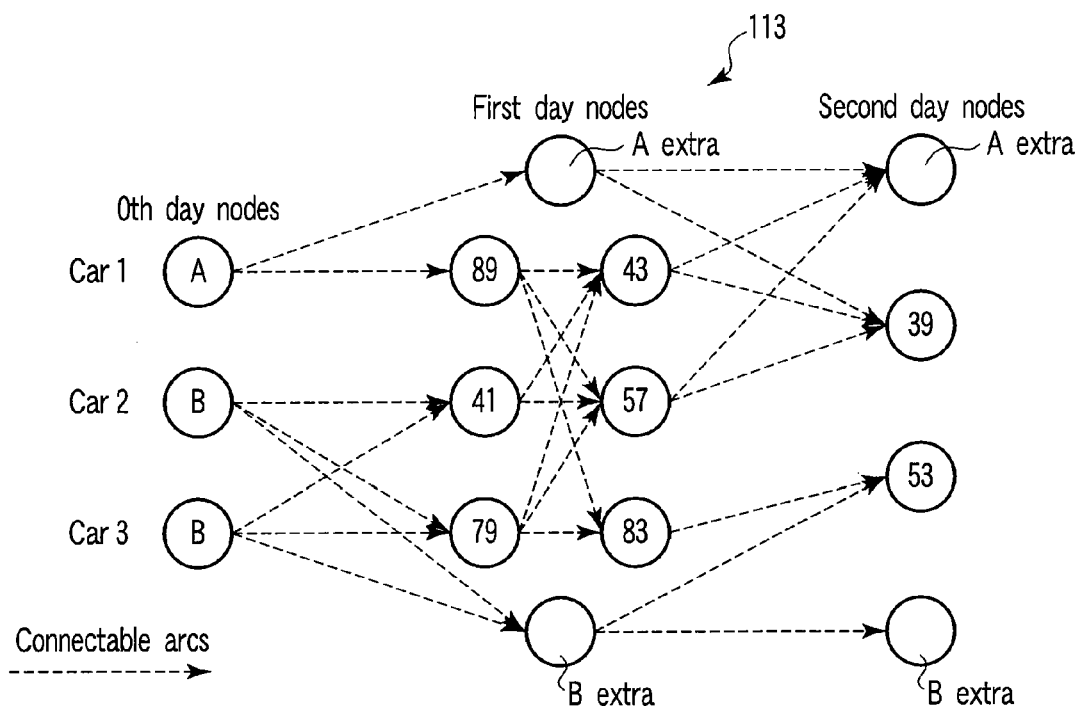
F I G. 7
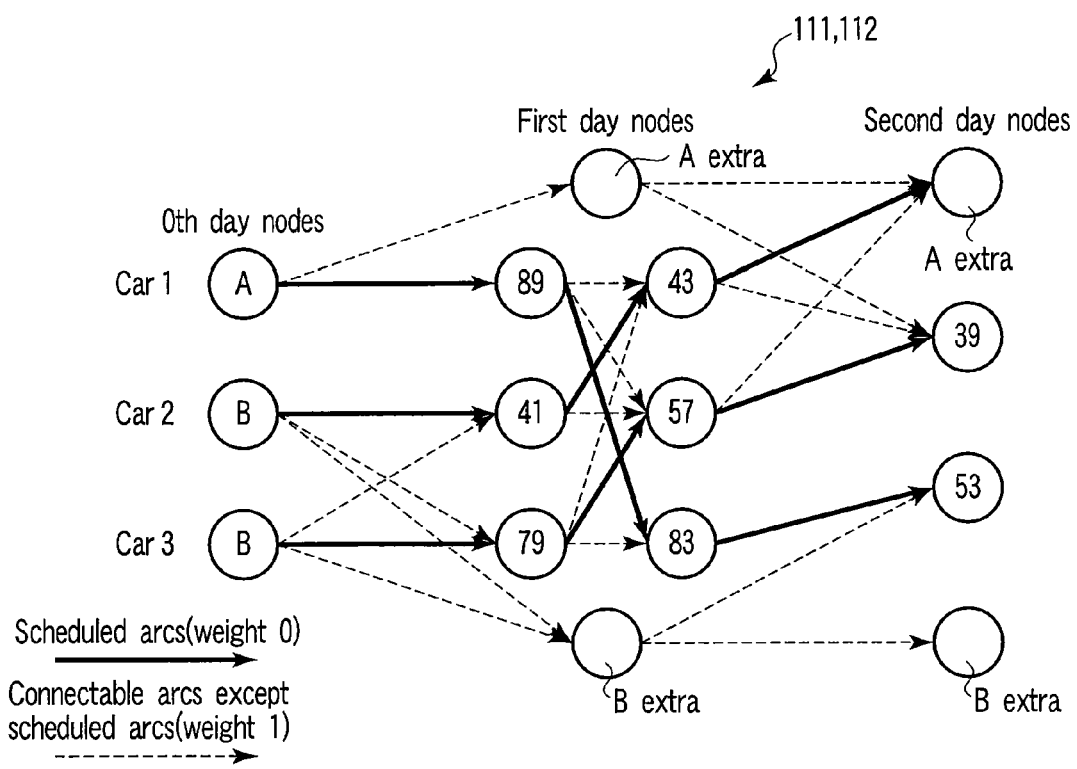
F I G. 8

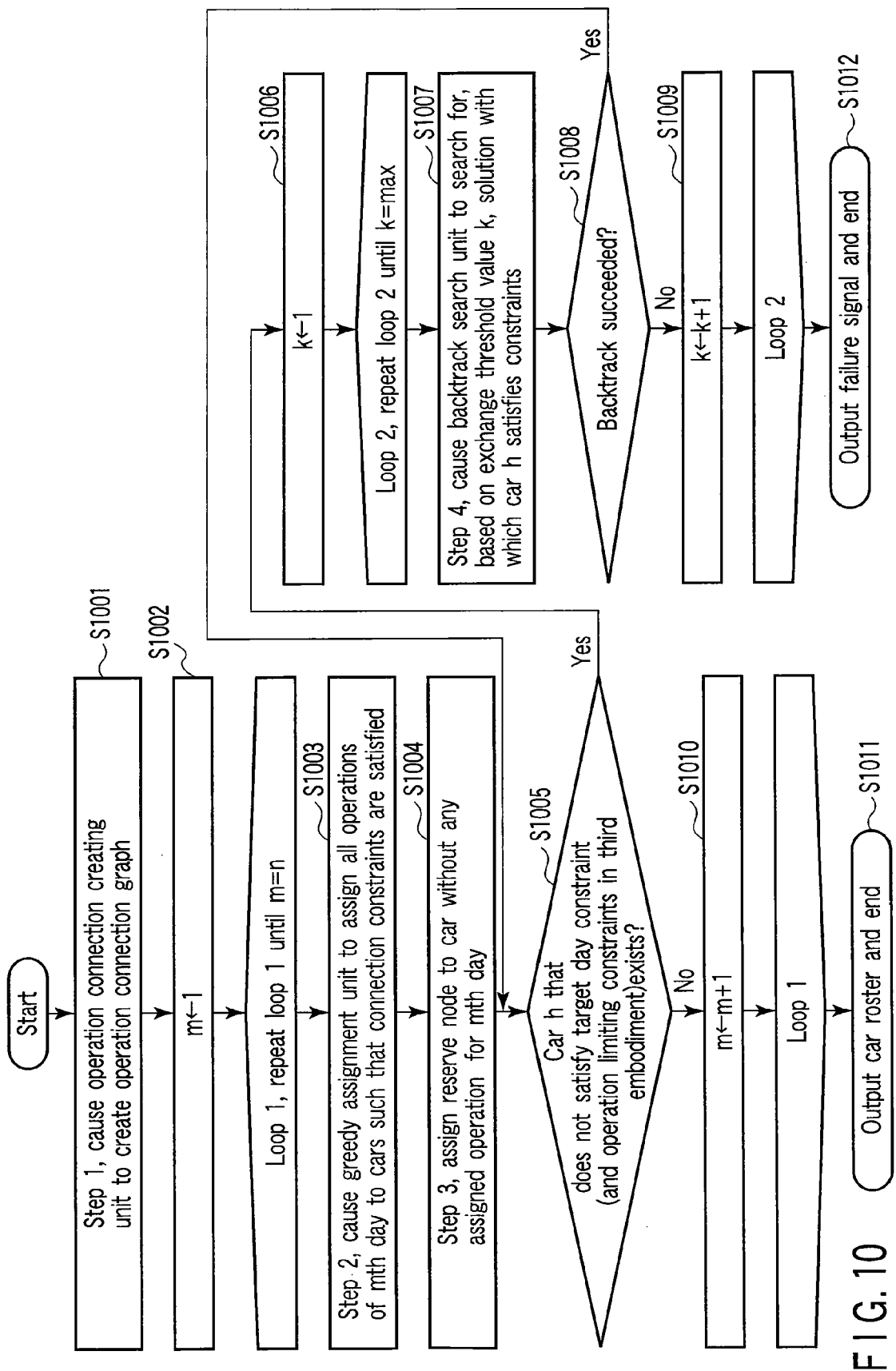
F I G. 10

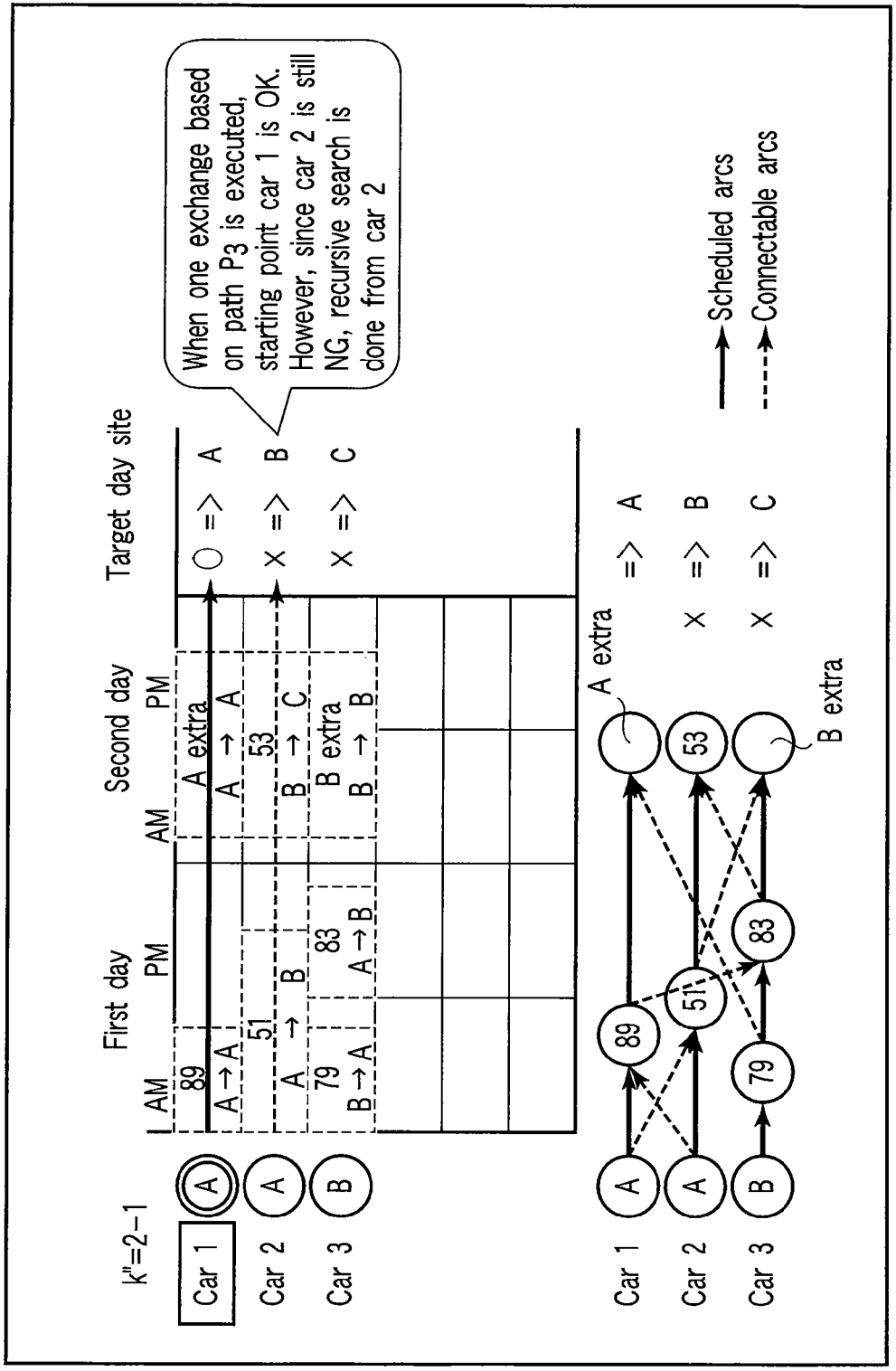
F I G. 26

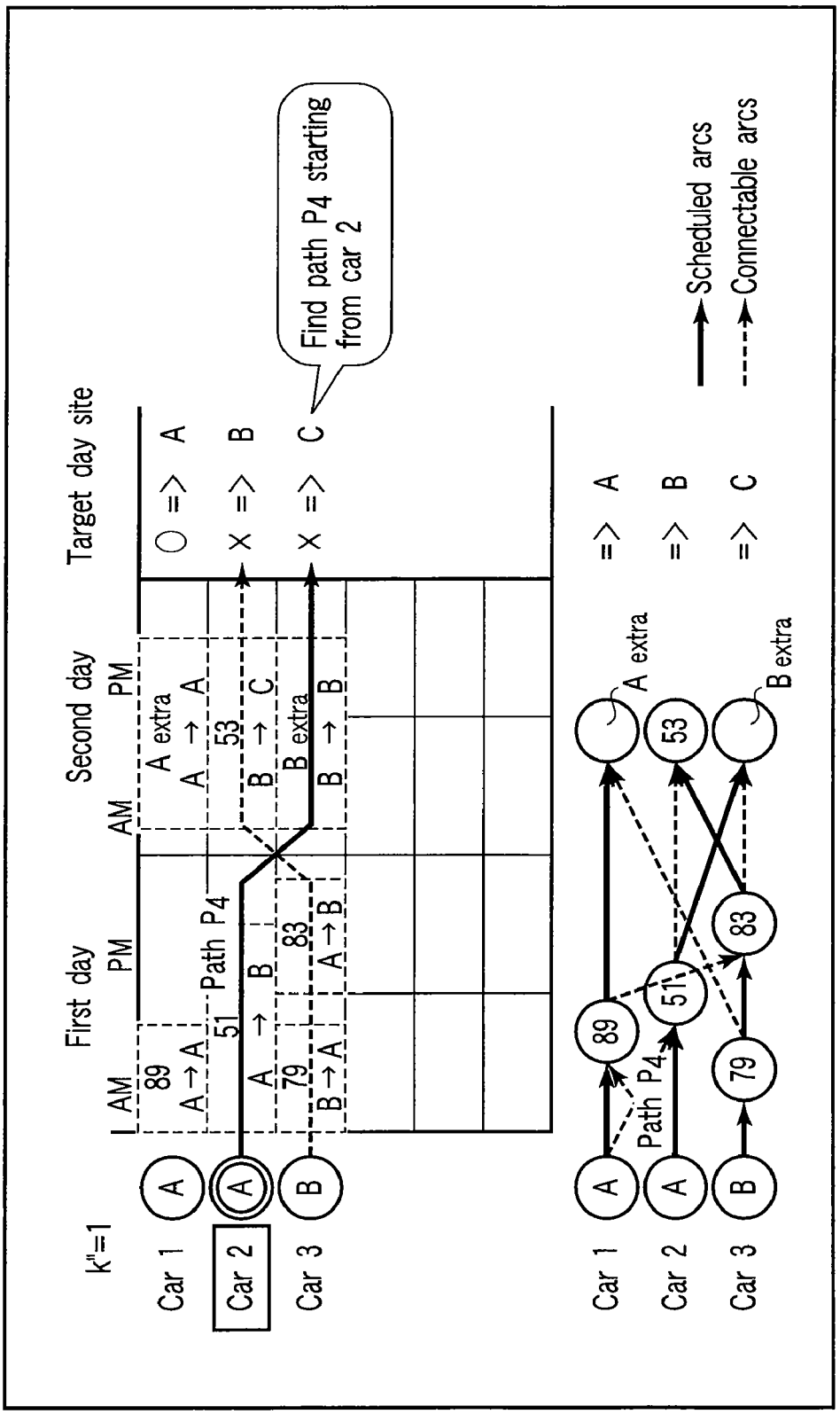
F I G. 27

ROLLING STOCK SCHEDULING APPARATUS AND METHOD

CROSS-REFERENCE TO RELATED APPLICATIONS

This application is based upon and claims the benefit of priority from prior Japanese Patent Application No. 2007-280765, filed Oct. 29, 2007, the entire contents of which are incorporated herein by reference.

BACKGROUND OF THE INVENTION

1. Field of the Invention

The present invention relates to a rolling stock scheduling apparatus and method of assigning all of a plurality of operations each having a predetermined departure time, departure site, arrival time, and arrival site to a plurality of available cars in consideration of operation limiting constraints and, more particularly, to creation of an initial plan that satisfies the constraints of a car operation.

2. Description of the Related Art

Many railway operators determine, for all train lines, the departure and arrival times from the departure site to the arrival site based on a train diagram. To actually operate trains, it is necessary to decide rolling stock sets (to be referred to as "cars" hereinafter) to be assigned to each series of line unit from a departure station to an arrival station on the train diagram (to be referred to as "train lines" hereinafter). Deciding the car assignment is called rolling stock scheduling.

In rolling stock scheduling, car assignment is done for each train line or a line group. The minimum unit of car assignment will be referred to as an "operation".

Each operation has a predetermined departure time, departure site, arrival time, and arrival site. Every operation can be assigned to one of available cars in consideration of some operation limiting constraints. It is also possible to assign a plurality of operations to a single car in a single day without conflict.

According to "Railway Scheduling Algorithm" (Planning System Laboratory of Railway Technical Research Institute), rolling stock scheduling has the following constraints in general.

(1) Each car can depart from only its final arrival site of the day before. When a plurality of operations are assigned to a single car in a day, the second and subsequent operations to be assigned are limited to those starting from immediately preceding arrival sites (this constraint will be referred to as a "connection constraint" hereinafter).

(2) The difference in facility conditions between routes limits operable types of rolling stock.

(3) Operators have an obligation by law to periodically make inspections such as a general inspection, regular inspection, and daily inspection of each car.

(4) It is necessary to periodically ensure time for maintenance such as supply and cleaning of cars and passenger rooms.

In many cases, a scheduling plan that satisfies these constraints is made every predetermined period. This work is called "initial scheduling". In this case, constraints associated with the initial day of schedule are newly imposed because connection to the immediately preceding period must be taken into consideration.

Operation disorder caused by, e.g., disorder in the schedule, or an urgent car work require a change of the original schedule. In this case, a schedule change that should allow to return to the original schedule as soon as possible is often made in consideration of the urgent situations. This work is called "rescheduling". In rescheduling, it is necessary to restore the original schedule on the target day. For this reason, not only constraints associated with the initial day of schedule but also constraints associated with the place at which each car should arrive on the target day are separately imposed. The works of "initial scheduling" and "rescheduling" are called together "rolling stock scheduling".

For the problem of rolling stock scheduling with the complex constraints, conventionally, many railway operators appoint a person in charge of scheduling, who often manually makes up a schedule based on his/her experiences and knowledge. Generally, initial scheduling is done to make a car roster as shown in FIG. 6 every predetermined period. Then, rescheduling is done, when the necessity arises.

Several automatic rolling stock scheduling techniques are disclosed. For example, the problem of rolling stock scheduling is modeled using a graph in which a train line is defined as a node, and a train line connectability as an arc (and identical train lines on different days are regarded as identical nodes). Circuits on the graph are obtained, thereby automatically making a periodical rolling stock scheduling plan. In another technique, the problem of rolling stock scheduling is modeled using a graph in which an operation is defined as a node, and an operation connectability as an arc. A genetic algorithm is used on the graph, thereby automatically making a scheduling plan that further increases an evaluation value. There is also disclosed still another technique associated with the problem of rolling stock scheduling, in which a periodical rotation pattern is created first. The pattern is changed as needed, thereby automatically making a scheduling plan (e.g., JP-A 2000-71988 (KOKAI)).

The procedure of initial scheduling or rescheduling by the person in charge of scheduling is based on trial and error. For this reason, the work is very time-consuming, and the quality of the schedule depends on the capability of the responsible person himself/herself. In addition, since the human work is not necessarily perfect, the schedule may be changed more than necessary by rescheduling, resulting in a large overhead of the change work. If a solution that should exist cannot be found, the operator is forced to take an emergency measure such as deadheading, transfer of operations, or vehicle exchange.

The conventional techniques can make a periodical or semi-periodical rolling stock scheduling plan but cannot cope with situations that often happen. An actual schedule is not periodical at all because it includes a schedule for weekdays and that for weekend and holidays, and the national holidays appear aperiodically. Additionally, the schedule can hardly be periodical because the constraints on the schedules of inspections and cleanings of cars is affected by the irregular schedule of each worker or a working site.

In the method of using a genetic algorithm on a graph, an initial solution is found, and solutions having high evaluation values are then successively generated from the initial solution. However, finding the initial solution itself is sometimes difficult. Solution is possible only in a simple problem with relaxed constraints. Finding the initial solution itself is very difficult especially in a problem with constraints that often appear in actuality, like a case that there are constraints associated with a place at which a car should arrive, a case that operation limiting constraints are strict, or a case that a plurality of operations are assigned to a single car in a single day, as in the problem to be solved by the present invention.

In the technique of the patent reference (e.g., JP-A 2000-71988 (KOKAI)) of creating a periodical rotation pattern, if a schedule does not satisfy constraints in the initial solution search stage or rescheduling stage for making a better schedule, a solution that satisfies the constraints is searched by backtrack search. However, this method only searches for a solution of one exchange between a car that does not satisfy the constraints and another car. A solution that satisfies the constraints is obtained by this simple method only in a simple case with relaxed constraints. In fact, it is impossible to obtain a solution in any problem to be described in the following embodiments of the present invention by this method. Additionally, the method of increasing the number of backtrack search conditions as the number of constraints increases, as described in this invention, is not preferable. This is because in an actual problem in which the constraints change every day, the maintenance cost of the backtrack search unit increases, resulting in difficult operations.

In the above-described prior arts, it is expected to be difficult to obtain a solution that satisfies the strict constraints of a car operation.

BRIEF SUMMARY OF THE INVENTION

In accordance with an aspect of the invention, there is provided a rolling stock scheduling apparatus comprising: a creation unit configured to create an operation connection graph for each car from an initial day to a target day, the graph including nodes representing initial day sites, target day sites, and first operations, the first operations being defined by a departure time, a departure site, an arrival time, and an arrival site, the graph also including arcs each of which indicates nodes' connectability based on the departure site, the arrival site, the departure time and the arrival time; a setting unit configured to set a plurality of paths that connect second operations for each car on each day sequentially from the initial day to the target day, the second operations being included in the first operations; an exchange unit configured to exchange, if there is a first car which does not exist at the target day site on the target day, each arc so that all cars exist at target day sites on the target day; and an output unit configured to output, if second paths on which all the cars exist at the target day sites on the target day are found, third operations corresponding to each of the second paths as a car operation, the second paths being set by the setting unit.

BRIEF DESCRIPTION OF THE SEVERAL VIEWS OF THE DRAWING

FIG. 4 is a view showing an example of operation pattern information which is input to the automatic rolling stock scheduling unit in FIG. 1;

FIG. 5 is a view showing an example of operation limiting constraint information which is input to the automatic rolling stock scheduling unit in FIG. 1;

FIG. 6 is a view showing an example of a car roster including a schedule candidate plan which is output from the automatic rolling stock scheduling unit in FIG. 1;

FIG. 7 is a view showing an example of an operation connection graph;

FIG. 8 is a view showing an example of an assignment graph;

FIG. 10 is a flowchart illustrating an example of the operation of the rolling stock scheduling apparatus shown in FIG. 9;

FIG. 26 is a view showing a case in which exchange is done based on the path $P_3$ in FIG. 25;

FIG. 27 is a view showing a case in which backtrack search is recursively executed from car 1 in FIG. 24;

DETAILED DESCRIPTION OF THE INVENTION

Figures 1, 2, 3:
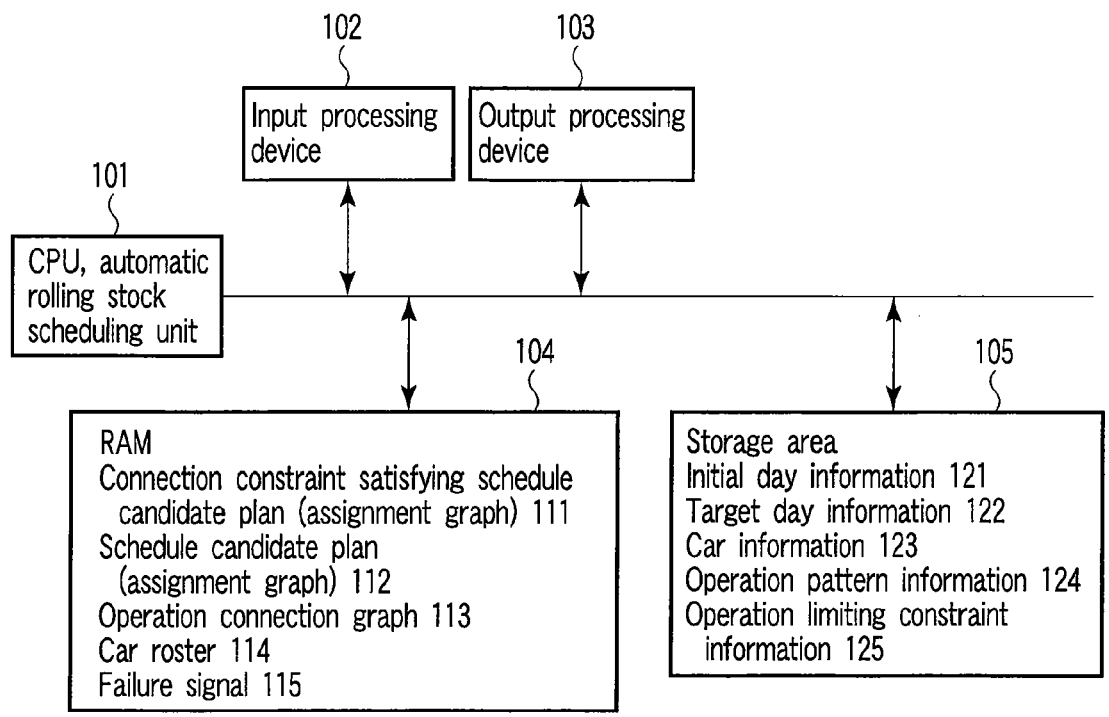
FIG. 1 is a view showing the basic arrangement of a rolling stock scheduling apparatus according to embodiments.
FIG. 2 is a view showing an example of initial day information and target day information which are input to an automatic rolling stock scheduling unit in FIG. 1.
FIG. 3 is a view showing an example of car information which is input to the automatic rolling stock scheduling unit in FIG. 1.

A rolling stock scheduling apparatus and method according to embodiments will now be described in detail with reference to the accompanying drawing. In the following embodiment, same reference numerals denote parts that perform the same operations, and a repetitive description thereof will be omitted.

In this embodiment, the problem of rolling stock scheduling is modeled using an operation connection graph represented by nodes and arcs. A node indicates an operation, and an arc indicates an operation connectability. A series of assignments for each car is expressed as one path on the operation connection graph.

Automatic rolling stock scheduling is done by repeatedly executing a greedy assignment unit (to be described later) and a backtrack search unit (to be described later) which lists candidates to find a new way out of a deadlock of greedy assignment halfway during scheduling.

Especially, this embodiment is characterized in that when solving a deadlock, the backtrack search unit lists solutions, in the order of a number of times of exchange from smallest, based on scheduled arcs on the operation connection graph.

According to the rolling stock scheduling apparatus and method of the present invention, a car roster which satisfies given constraints is automatically created in a shorter time.

(Basic Arrangement of System)

The basic arrangement of the rolling stock scheduling apparatus will be described with reference to FIG. 1.

The rolling stock scheduling apparatus according to the embodiment includes an automatic rolling stock scheduling unit 101, input processing device 102, and output processing device 103.

The input processing device 102 receives various kinds of data inputs and converts them into input data containing initial day information 121, target day information 122, car information 123, operation pattern information 124, and operation limiting constraint information 125.

The automatic rolling stock scheduling unit 101 receives the initial day information 121, target day information 122, car information 123, operation pattern information 124, and operation limiting constraint information 125, performs predetermined computing, and outputs a schedule candidate plan 112 or a failure signal 115.

The output processing device 103 receives the schedule candidate plan 112 or failure signal 115, performs simple processing for it, and outputs a car roster 114.

In the present invention, details of the input processing device 102 and the output processing device 103 are not particularly limited, and details of the automatic rolling stock scheduling unit 101 will mainly be described below.

<Initial Day Information 121 and Target Day Information 122>

The initial day information 121 and the target day information 122 which are input to the automatic rolling stock scheduling unit 101 will be described next with reference to FIG. 2.

As shown in FIG. 2, the initial day information 121 represents the date of the initial day of a period for which initial scheduling or rescheduling should be done. As shown in FIG. 2, the target day information 122 represents the date of the target day of a period for which initial scheduling or rescheduling should be done.

<Car Information 123>

The car information 123 which is input to the automatic rolling stock scheduling unit 101 will be described next with reference to FIG. 3.

As shown in FIG. 3, the car information 123 includes the information of the site on the initial day of the schedule and the target arrival site for rescheduling of each car.

<Operation Pattern Information 124>

The operation pattern information 124 which is input to the automatic rolling stock scheduling unit 101 will be described next with reference to FIG. 4.

As shown in FIG. 4, the operation pattern information 124 defines the pattern of an operation to be assigned on a given day, which is determined in accordance with the daily schedule pattern. For example, if the schedule for weekdays and that for weekend and holidays are different, the operation pattern also changes. The operation pattern information 124 includes a plurality of operations for each pattern.

<Operation Data>

Details of operation data included in the operation pattern information 124 will be explained next.

As shown in FIG. 4, the operation data has four attributes: departure site, departure time, arrival site, and arrival time. To schematically express it, operations are represented by blocks, and the blocks are sequentially arranged on a table having a vertical axis representing cars and a horizontal axis representing date and time, as shown on the upper side of FIG. 18, thereby expressing operation assignments to cars.

Figure 18:
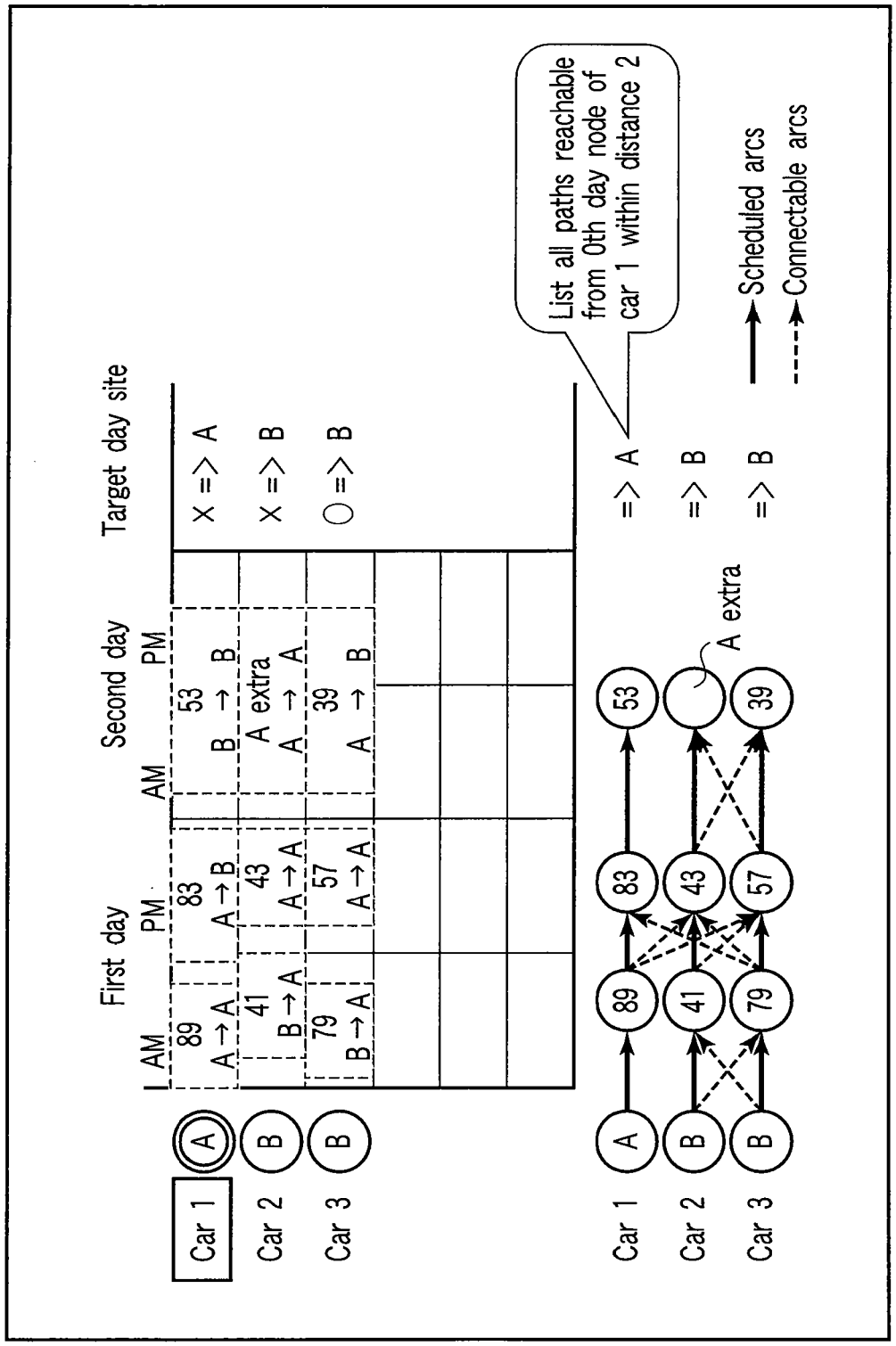
FIG. 18 is a view showing an application example of the first embodiment.

As shown in FIG. 18, assignments to the same car are arrayed on a horizontal line. Connection constraints between the operations can be confirmed sequentially from the operations assigned on the initial day to the right. More specifically, to consecutively assign operations to a single car, the arrival site of the preceding operation needs to match the departure site of the succeeding operation, and the arrival time of the preceding operation needs to be earlier than the departure time of the succeeding operation.

In rescheduling, it is necessary to arrive at the predetermined site on the target day in the car information 123. This is called a "target day constraint".

<Operation Limiting Constraint Information 125>

The operation limiting constraint information 125 which is input to the automatic rolling stock scheduling unit 101 will be described next with reference to FIG. 5.

As shown in FIG. 5, the operation limiting constraint information 125 limits assignable operations for a given car on a given day. For example, if a legal inspection or cleaning is scheduled for car 1 on the first day, and there is an operation that conflicts with execution of the work, a constraint such as "operation 57 cannot be assigned to the first day of car 1" may be imposed.

If operation assignment to cars is limited due to special operation conditions (e.g., the number of cars or constraints on safety equipment), a constraint such as "only operation 23 is always assignable to car 4" may be imposed.

If a car cannot be assigned operations for a predetermined period due to, e.g., shop-in for a predetermined period, a constraint such as "no operation is assignable to car 6 from the second day to the 10th day" may be imposed.

<Output of Automatic Rolling Stock Scheduling Unit 101>

The output of the automatic rolling stock scheduling unit 101 will be described next with reference to FIG. 6.

When rolling stock scheduling has succeeded, the automatic rolling stock scheduling unit 101 outputs the schedule candidate plan 112. This data is the base of the car roster 114 in FIG. 6. On the other hand, if rolling stock scheduling has failed, the automatic rolling stock scheduling unit 101 outputs the failure signal 115.

<Operation Connection Graph 113>

The operation connection graph 113 will be described next with reference to FIG. 7.

As shown in FIG. 7, the operation connection graph 113 includes nodes which represent operations of the operation pattern of each day, and directed arcs which represent the connectabilities between the operations. If only operations that actually exist are used as nodes, scheduling is cumbersome because for example, an operation node that arrives at a site A on the first day is connectable to all operation nodes that depart from the site A on the second and subsequent days. To avoid the cumbersomeness, a node called "extra node" is prepared for each day to express stay at the same site for one day. A node which is assigned no operation at all for one day is assigned the extra node. An extra node that stays at the site A expresses an extra car that stays at the site A all day. The attributes of the extra node are Departure site: A
Arrival site: A
Departure time: sufficiently early time
Arrival time: sufficiently late time These attributes implement constraints that the extra node and the remaining operation nodes are handled without distinction, and no operation is assigned to a car that is assigned the extra node. Introduction of the extra node allows the user to consider only the connectability of the next node for a day of interest and the next day.

For the descriptive convenience, a node (to be referred to as a "0th day node" hereinafter) corresponding to the departure site of the initial day is added for each car on the operation connection graph, as shown in FIG. 7. If nodes corresponding to the operations of the initial day include a node whose departure site matches the site of the 0th day node, the node is connected to the 0th day node by a directed arc.

<Setting of Problem of Rolling Stock Scheduling>

The problem of rolling stock scheduling is modeled using the operation connection graph. If a path that satisfies connection constraints from the 0th day node is present for each car, the nodes included in the paths of the cars do not overlap, and all nodes except for the extra nodes are included in the paths of the cars, the schedule corresponding to these paths is, e.g., a schedule candidate plan 111 that satisfies the connection constraints, as shown in FIG. 8.

FIG. 8 shows an example of assignment up to the second day. In the graph shown in FIG. 8, the paths that connect the operations assigned to the cars are indicated by solid lines. Of the connectable arcs on the operation connection graph, the arcs on the solid lines are called "scheduled arcs". An operation connection graph which expresses the connection of assigned operations by the scheduled arcs is called an "assignment graph". Greedy assignment or backtrack search to be described below is performed while updating the assignment graph.

In the example shown in FIG. 8, the paths starting from the 0th day nodes of the respective cars form the schedule candidate plan 111 that satisfies the connection constraints because the paths satisfy the connection constraints, and all nodes except for the extra nodes of the first and second days are assigned to the cars. The output processing device 103 converts the schedule candidate plan 111 that satisfies the connection constraints into the car roster 114 shown in FIG. 6.

First Embodiment

In this embodiment, rescheduling without considering operation limiting constraint information 125 will be described. Note that in initial scheduling, the following processing is executed assuming that no target day constraints exists.

Figure 9:
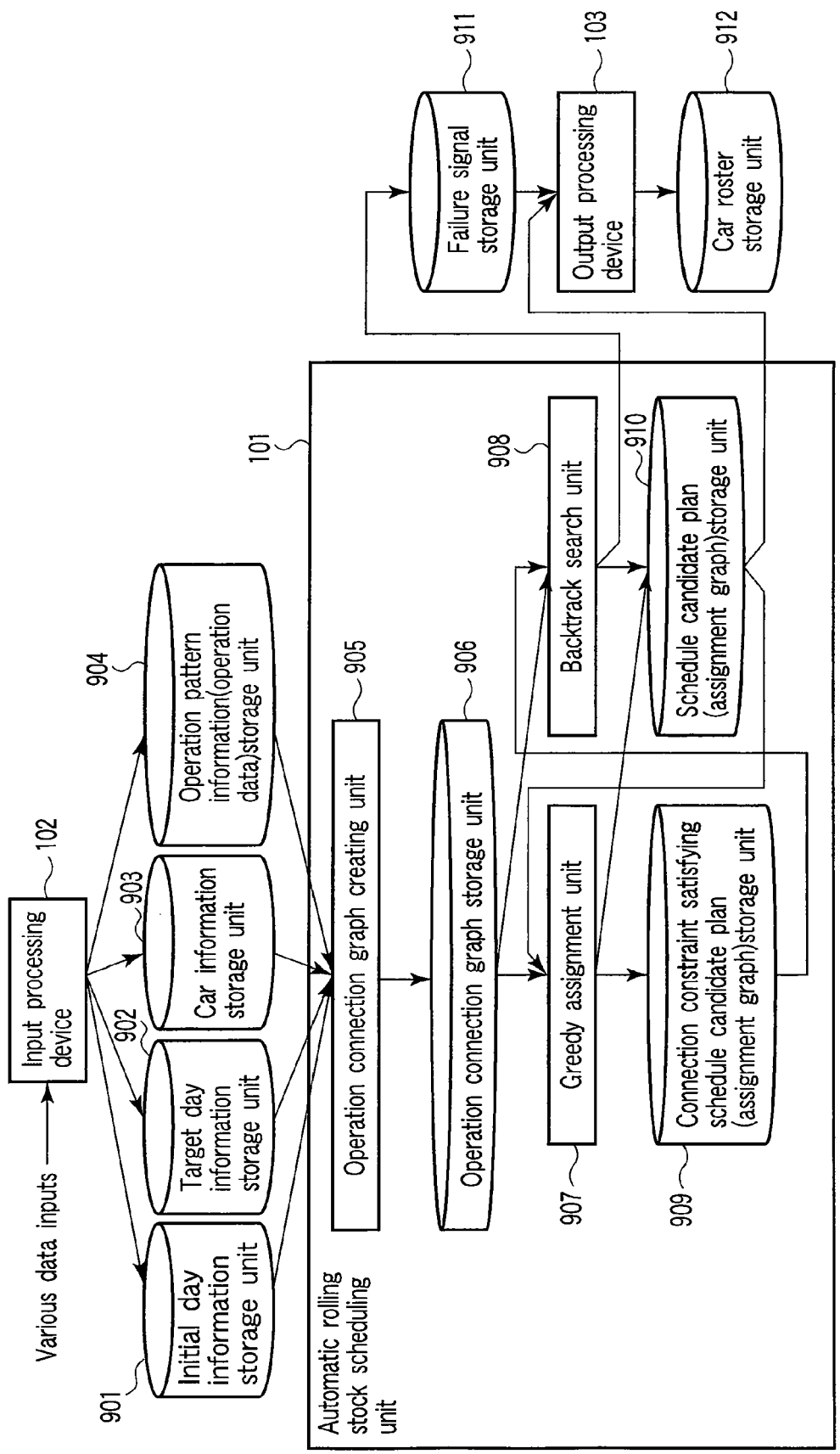
FIG. 9 is a block diagram of a rolling stock scheduling apparatus according to the first and second embodiments.

A rolling stock scheduling apparatus according to this embodiment will be described with reference to FIG. 9.

The rolling stock scheduling apparatus according to this embodiment includes an input processing device 102, initial day information storage unit 901, target day information storage unit 902, car information storage unit 903, operation pattern information (operation data) storage unit 904, operation connection graph creating unit 905, operation connection graph storage unit 906, greedy assignment unit 907, backtrack search unit 908, connection constraint satisfying schedule candidate plan (assignment graph) storage unit 909, schedule candidate plan (assignment graph) storage unit 910, failure signal storage unit 911, output processing device 103, and car roster storage unit 912. An automatic rolling stock scheduling unit 101 includes the operation connection graph creating unit 905, operation connection graph storage unit 906, greedy assignment unit 907, backtrack search unit 908, connection constraint satisfying schedule candidate plan storage unit 909, and schedule candidate plan storage unit 910.

The automatic rolling stock scheduling unit 101 receives initial day information 121 stored in the initial day information storage unit 901, target day information 122 stored in the target day information storage unit 902, car information 123 stored in the car information storage unit 903, and operation pattern information 124 stored in the operation pattern information storage unit 904. If scheduling has failed, the automatic rolling stock scheduling unit 101 outputs a failure signal 115. If scheduling has succeeded, the automatic rolling stock scheduling unit 101 outputs a schedule candidate plan 112.

The operation connection graph creating unit 905 creates an operation connection graph 113. This will be described later in detail with reference to FIG. 11.

The greedy assignment unit 907 assigns all operation nodes included in the pattern of the mth (m is a non-negative number) day to cars such that the connection constraints are satisfied. This will be described later in detail with reference to FIG. 13. The greedy assignment unit 907 assigns, to a car having no operation assigned for the mth day, an extra node that stays at the arrival site of the car on the preceding day. This will be described later in detail with reference to FIG. 15.

If there is a car h that does not satisfy the target day constraint, the backtrack search unit 908 performs a backtrack search for the car h. The backtrack search is repeatedly executed until the backtrack succeeds while sequentially increasing an exchange threshold value k from 1 to max. The backtrack search will be described later in detail with reference to FIG. 17.

In rescheduling, instead of inputting the target day information 122, the target day information 122 may sequentially be increased from 1 to restore the original schedule as soon as possible. In this case, the information of the target arrival site of each car in the car information 123 needs to be prepared for all target day candidates.

Control Sequence of First Embodiment

An example of the operation of the rolling stock scheduling apparatus according to the first embodiment will be described next with reference to FIG. 10. Assume that the target day of rescheduling is nth (n is a non-negative number) day. The sequence shown in FIG. 10 is common to the second and third embodiments to be described later. However, the third embodiment is different in that not only the target day constraints but also the operation limiting constraints are checked in branch step S1005.

In Step 1, the operation connection graph 113 is created (step S1001). Next, m=1 is set (step S1002), and loop 1 in steps S1003 to S1010 is repeated until m==n. In Steps 2, 3, and 4, the greedy assignment unit 907 and the backtrack search unit 908 make up a schedule that satisfies constraints while updating the assignment graph for each day (mth day) from the initial day to the target day.

In Step 2, the greedy assignment unit 907 assigns all operations included in the mth day pattern to cars such that connection constraints are satisfied (step S1003). In Step 3, the greedy assignment unit 907 assigns, to a car having no operation assigned for the mth day, an extra node that stays at the arrival site of the car on the preceding day (step S1004).

If there is no car h that does not satisfy the target day constraint at this point of time (NO in step S1005), and m is the target day (m==n), loop 1 ends. If m is not the target day, m is incremented by one, and processing for the next day starts. Note that at the point of time of step S1005 where greedy assignment and backtrack search are completed, an assignment that satisfies the connection constraints is always obtained. Hence, an assignment in which all cars satisfy the target day constraints corresponds to an assignment that satisfies all constraints. The target day constraints are checked only in the day (m==n-1) immediately before the target day. For this reason, YES in step S1005 holds only when n==n-1.

On the other hand, if there is the car h that does not satisfy the target day constraint (YES in step S1005), k=1 is set for the car h (step S1006), and loop 2 in steps S1007 to S1009 is repeated until k==max. In step 4, the backtrack search unit 908 performs a backtrack search. The backtrack search is repeatedly executed until the backtrack succeeds while sequentially increasing the exchange threshold value k from 1 to max. When the backtrack has succeeded (YES in step S1008), the process returns to step S1005. If the backtrack cannot succeed even when k=max, a failure signal is output, and the processing ends.

If all operations up to the target day are successfully assigned by the above-described processing, a car operation is output, and the processing ends. The sequence in FIG. 10 yields the same effect as described above even when several changes to be described below are made.

First, in Step 2 of FIG. 10, all operations of one day are assigned by greedy assignment, and then, a backtrack search is performed. However, greedy assignment and backtrack search may be repeated for each operation. In Step 3 of FIG. 10, an extra node is assigned to a car having no operation node assigned in the day of interest. However, all-day stay at a given site can be expressed not by using an extra node but by changing conditions connected by a directed arc of the operation connection graph. The backtrack search in Step 4 of FIG. 10 is performed by determining the maximum exchange threshold value max in advance and sequentially increasing the threshold value k. Instead, the backtrack search may be done by using the maximum exchange threshold value max as a threshold value from the beginning.

<Operation Connection Graph Creating Unit 905>

Figure 11:
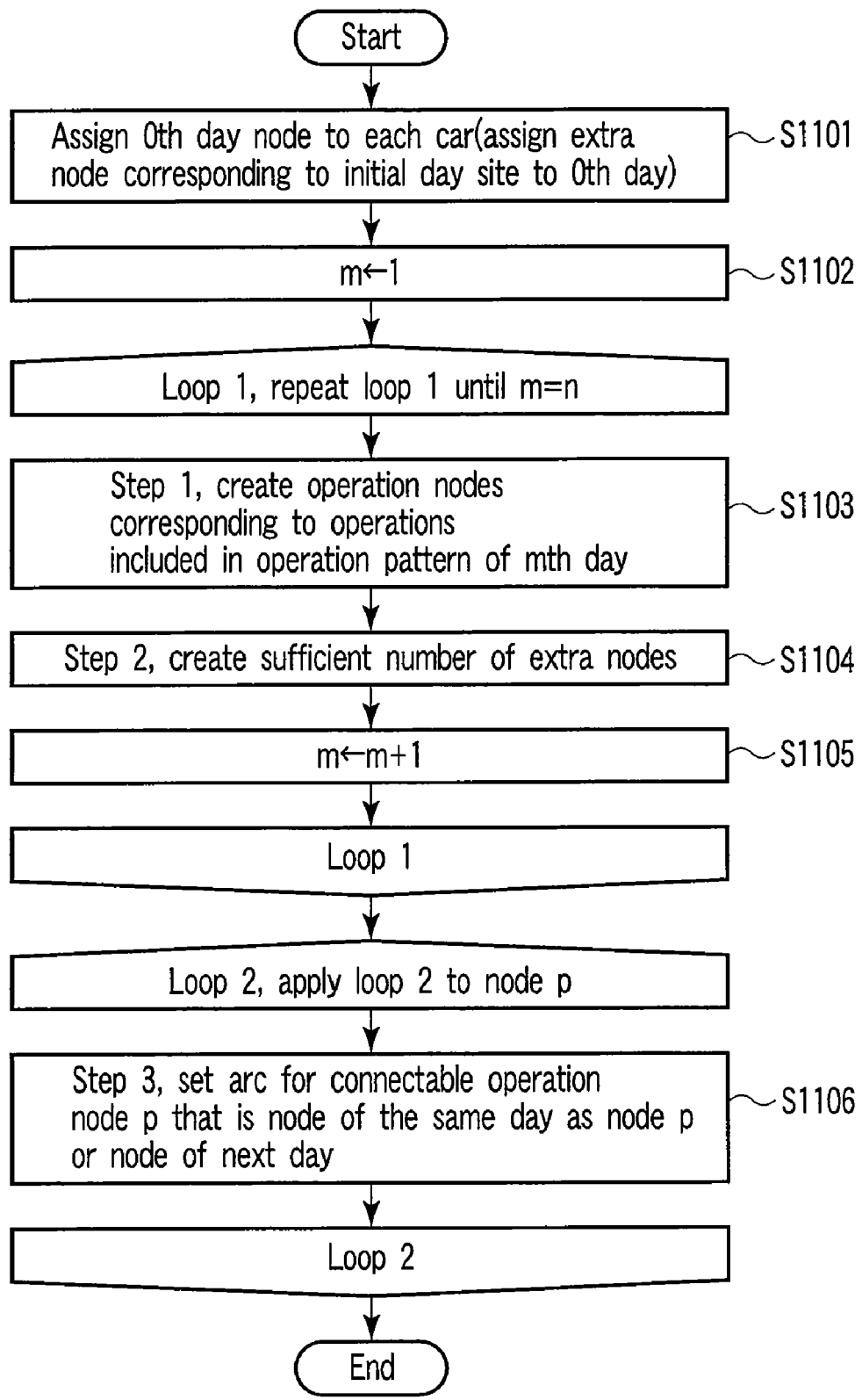
FIG. 11 is a flowchart illustrating an example of the operation of an operation connection graph creating unit shown in FIG. 9.

An example of the operation of the operation connection graph storage unit 905 when creating the operation connection graph 113 will be described next with reference to FIG. 11.

First, a 0th day node is assigned to each car (step S1101). Example of 0th day node assignment will be described with reference to FIG. 12. In the car information 123 shown in FIG. 3, the initial day site of car 1 is A. Hence, node A is assigned as the 0th day node. This node is connectable to an operation that departs from site A on the first day. Similarly, node B is assigned to car 2, and node B is assigned to car 3 (see FIG. 7).

Next, Steps 1 and 2 are sequentially executed for each day, thereby creating nodes. More specifically, m is set to 1, and loop 1 in steps S1103 to S1105 is repeated until m==n. Then, loop 2 in step S1106 is repeated. In Step 1, nodes corresponding to operations included in the mth day pattern are added. In Step 2, extra nodes necessary for the mth day are added. Extra nodes equal to or larger than the maximum number of possible nodes for each site are created.

The operation patterns of the first and second days are assumed to be those in FIG. 4. As shown in FIG. 7, operation nodes 89, 41, 79, 83, 43, and 57 are added as the first day nodes, and operation nodes 39 and 53 are added as the second day nodes. Extra nodes for the respective sites (in this case, one extra node corresponding to each site) are added for each day.

Each created node p is sequentially connected to a connectable node q by a directed arc (step S1106). Conditions to connect the node q to the node p are that the node q is a node of the same day as the node p or a node of the next day, the arrival site of the node p matches the departure site of the node q, and the arrival time of the node p is earlier than the departure time of the node q. In the example shown in FIG. 7, connectable nodes are connected by arcs based on the departure times, departure sites, arrival times, and arrival sites of operations corresponding to the nodes.

<Greedy Assignment Unit 907>

Figures 12, 13:
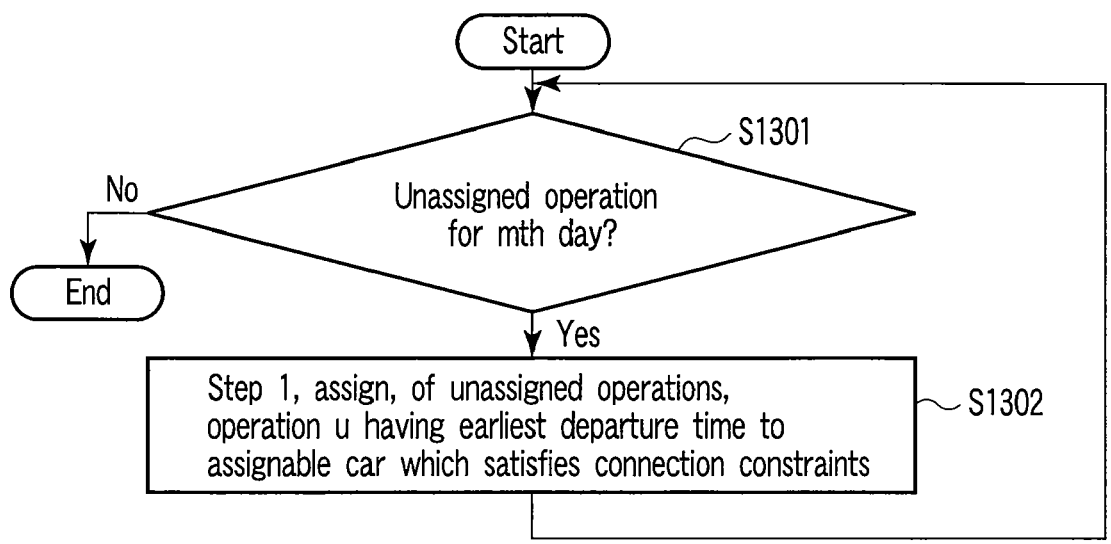
FIG. 12 is a view showing an example of node assignment to each car for the 0th day.
FIG. 13 is a flowchart illustrating an example of the operation of a greedy assignment unit shown in FIG. 9.

An example of the operation of the greedy assignment unit 907 will be described next with reference to FIG. 13.

In greedy assignment, operations included in the mth day operation pattern are assigned to assignable cars satisfying the connection constraints in ascending order of departure times. For example, in the example shown in FIG. 14, the operations are assigned in the order of 89→41→79 in ascending order of departure times. In the sequence shown in FIG. 13, it is determined whether there is an unassigned operation of the mth day (step S1301). If an unassigned operation is present, the operations included in the mth day operation pattern are assigned to assignable cars in ascending order of departure times (step S1302). This is one method of reliably assigning all operations. The processing is not particularly limited to this sequence if the method can assign all operations.

<Example of Scheme of Greedy Assignment Unit to Ensure Extra Cars at Maximum>

Assume that there are a plurality of assignable cars, and they include cars having operations assigned for the day of interest, and those without any operation assigned for the day of interest. In this case, a reference may be employed to preferentially assign operations to the former cars having assigned operations.

Figure 14:
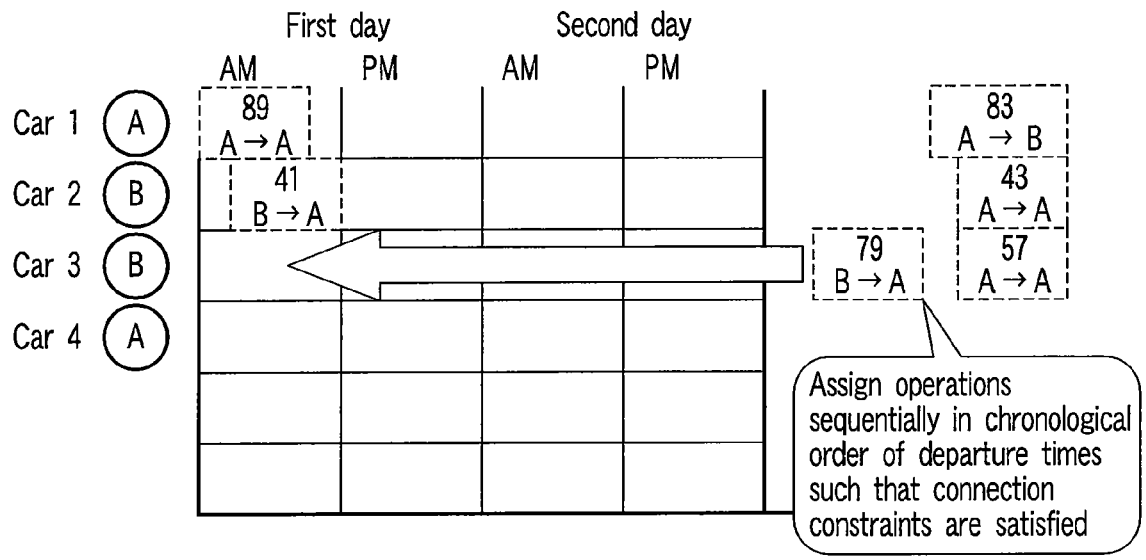
FIG. 14 is a view showing an example of greedy assignment for the first day.

In the example shown in FIG. 14, operation 79 is assigned. Then, the assignment target of operation 83 with the earliest departure time next to operation 79 is examined. Three cars, i.e., cars 1, 3, and 4 are possible assignment targets which satisfy the connection constraints of operation 83 (the operation cannot be assigned to car 2 because the arrival time of operation 41 is later than the departure time of operation 83). When the above-described reference is employed, out of cars 1 and 3 having assigned operations and car 4 without any assigned operation, one of cars 1 and 3 having assigned operations is assigned operation 83.

When such a reference is provided, the assignment obtained after the end of greedy assignment can ensure extra cars at maximum. In actual rolling stock scheduling, it is important to ensure extra cars as many as possible in case of accidents. For this reason, the reference is often useful.

<Extra Node Assignment>

Figure 15:
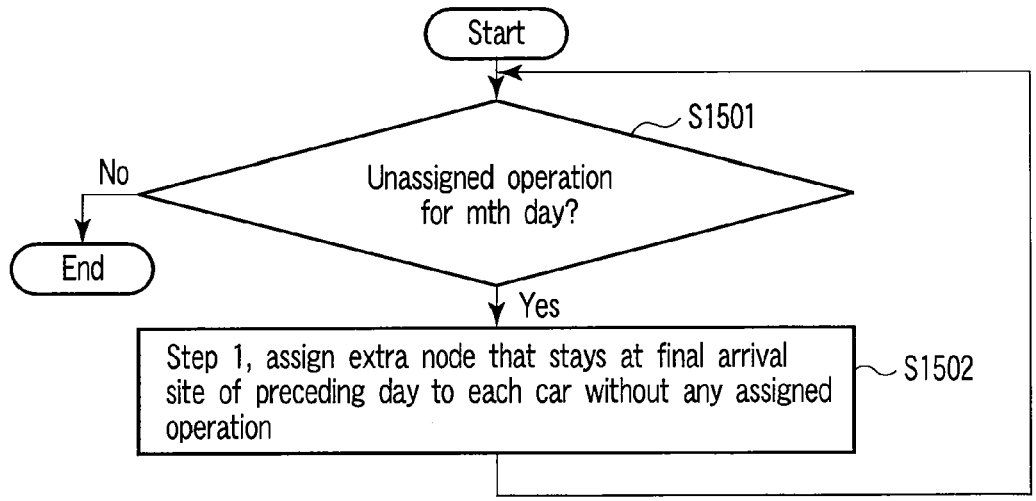
FIG. 15 is a flowchart illustrating an example of extra node assignment by the greedy assignment unit shown in FIG. 9.

Extra node assignment executed by the greedy assignment unit 907 will be described next with reference to FIG. 15.

Figure 16:
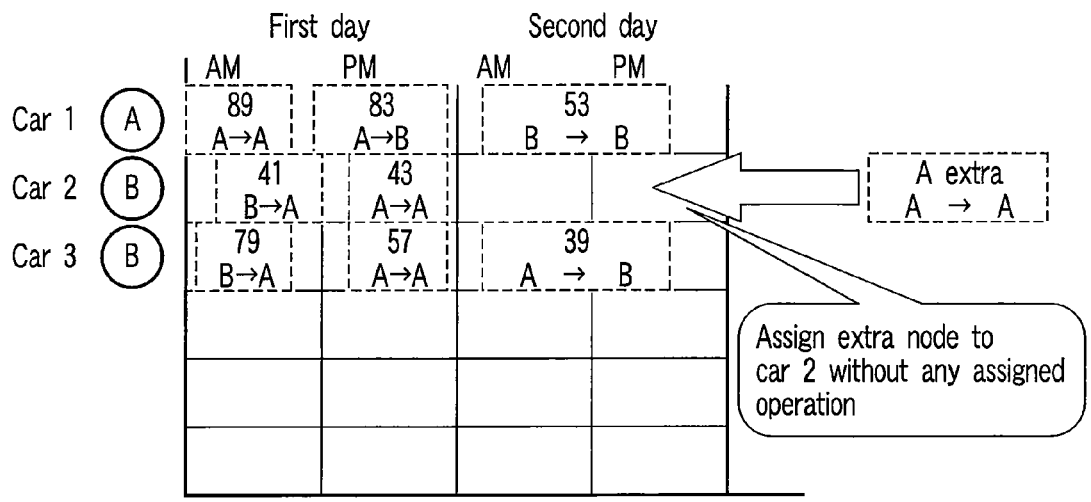
FIG. 16 is a view showing an example of extra node assignment to car 2 for the second day.

In extra node assignment, it is determined after the end of assignment of operations of the mth day whether a car without any assigned operation remains (step S1501). An extra node that stays at the final arrival site of the preceding day is assigned to each car without any assigned operation (step S1502). In the example shown in FIG. 16, after all operations (39 and 53) of the second day are assigned by greedy assignment, car 2 has no operation assigned. Hence, an extra node is assigned to car 2. In this case, since the final arrival site of the first day of car 2 is A, an extra node of site A is assigned.

<Backtrack Search>

A backtrack search up to the mth day, which is executed by the backtrack search unit 908 when the exchange threshold value of the car h that does not satisfy constraints is k, will be described next in detail with reference to FIG. 17.

(Listing of all Paths in Loop 1)

Figure 17:
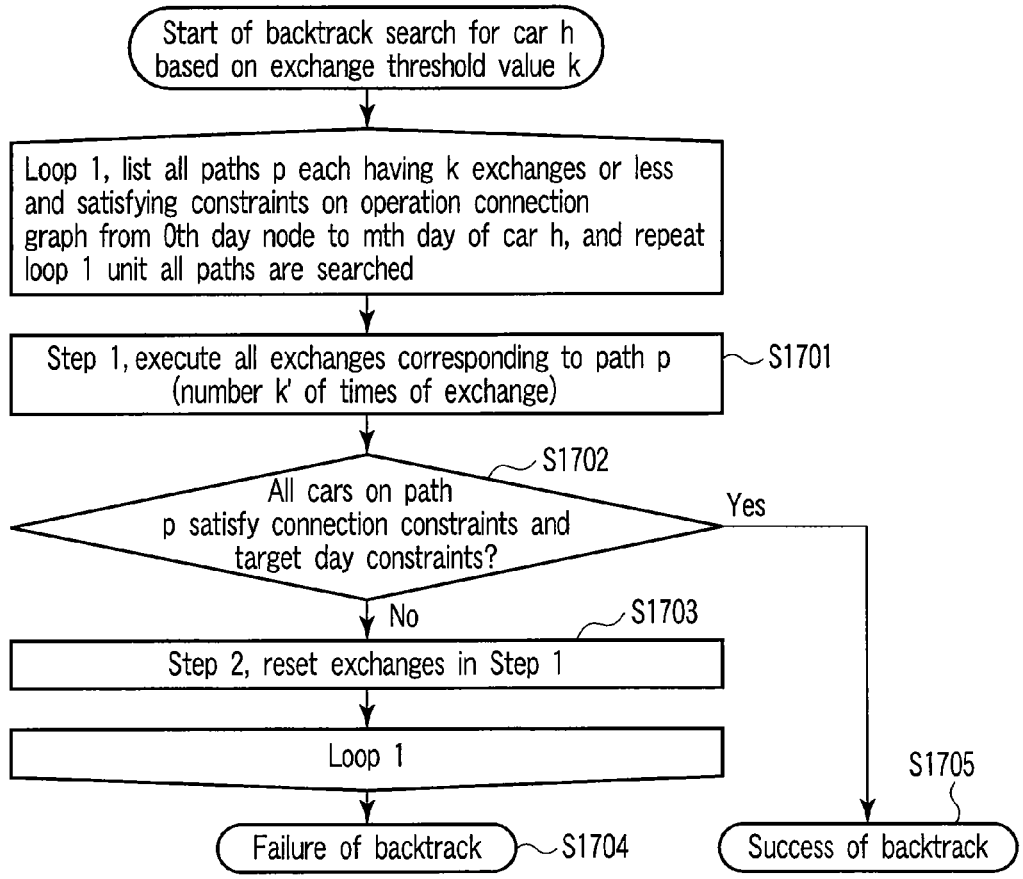
FIG. 17 is a flowchart illustrating an example of the operation of a backtrack search unit shown in FIG. 9.

In the backtrack search shown in FIG. 17, of all paths which start from the 0th day node of the car h and satisfy the connection constraints, paths each having k exchanges or less are sequentially checked by first loop 1 (the paths do not include extra nodes that are not scheduled yet). The number of times of exchange is the number of passages of the path through arcs (to be referred to as "exchange arcs" hereinafter) except scheduled arcs on the assignment graph.

Loop 1 in steps S1701 to S1703 is repeated until all paths p of the car on the assignment graph from the 0th day to the mth day, each of which satisfies the connection constraints and the target day constraint and includes k exchanges or less, are checked. First, all exchanges corresponding to the path p are done (step S1701). It is determined whether all cars on the path p satisfy the connection constraints and the target day constraints (step S1702). If these constraints are satisfied, it is determined that the backtrack has succeeded, and the processing ends (step S1705). If the constraints are not satisfied in step S1702, the exchanges which have been done in step S1701 are reset (step S1703), and step S1701 is executed again based on a new number of times of exchange.

More specifically, in, e.g., the assignment graph shown in FIG. 8, the paths of car 1, which satisfy the connection constraints and the target day constraint, include $p_1=A\rightarrow 89\rightarrow 43\rightarrow A$ (extra) and $p_2=A\rightarrow 89\rightarrow 57\rightarrow A$ (extra). In the path $p_1$, since arc $89\rightarrow 43$ is an exchange arc, the number of times of exchange of the path $p_1$ is 1. In the path $p_2$, since arcs $89\rightarrow 57$, and $57\rightarrow A$ (extra) are exchange arcs, the number of times of exchange of the path $p_2$ is 2.

The problem of listing all paths each including k exchanges or less is a problem of listing all paths within the distance k on the assignment graph in which scheduled arcs are given a weight "0", and the remaining exchange arcs are given a weight "1". Various methods such as a depth first search, width first search, and best first search are known as a method of listing all paths within the distance k. Any of them is usable.

(Execution of Exchange in Step 1)

If the path p which starts from the 0th day node of the car h and satisfies the connection constraints within the exchange threshold value k is obtained, all exchanges corresponding to the exchange arcs of the path p are done (step S1701). The exchange means that all paths, from the exchange arc node, of the car h and a car h2 to which the destination node of the exchange arc is assigned are exchanged. For example, in the path $p_1=A\rightarrow 89\rightarrow 43\rightarrow A$ (extra) shown in FIG. 8, the path of car 1 after exchange based on the exchange arc $89\rightarrow 43$ is $A\rightarrow 89\rightarrow 43\rightarrow A$ (extra). On the other hand, the path of car 2 to which destination node 43 of the exchange arc has been assigned is $B\rightarrow 41\rightarrow 83\rightarrow 53$ after exchange (using node 41 immediately before operation 43 on the initial path of car 2 and operation 83 immediately after operation 89 on the initial path of car 1). This assignment graph does not satisfy the connection constraints in fact. However, it is not checked at this point of time. If a path includes a plurality of exchange arcs, like the path $p_2$, exchanges are executed sequentially from an exchange corresponding to the exchange arc close to the 0th day node on the path.

(Constraint Check)

After exchange in Step 1, the connection constraints and target day constraints of all exchanged cars are checked. If all constraints are satisfied (YES in step S1702), an assignment graph which satisfies the constraints of the car h and all associated cars has been created. This indicates the success of backtrack, and the processing ends. On the other hand, if at least one of the constraints is not satisfied (NO in step S1702), the exchanges corresponding to the path p are reset (step S1703), and the processing of the next path candidate starts.

Detailed Example of First Embodiment

An application example of the above-described first embodiment will be explained by way of a detailed example mainly using a backtrack search based on initial day=1, target day n=2, and exchange threshold value max=2. From FIG. 18, operation block assignment is illustrated on the upper side, and an assignment graph on the lower side.

Assume that an assignment graph shown in FIG. 18 is obtained by greedy assignment up to the second day according to the flowchart in FIG. 10 (the processing of the first day is more simple, and a description thereof will be omitted). In this case, since car 1 does not satisfy the target day constraint (YES in step S1005), h=1 is set, and the process advances to the backtrack search sequence (FIG. 17).

Figure 19:
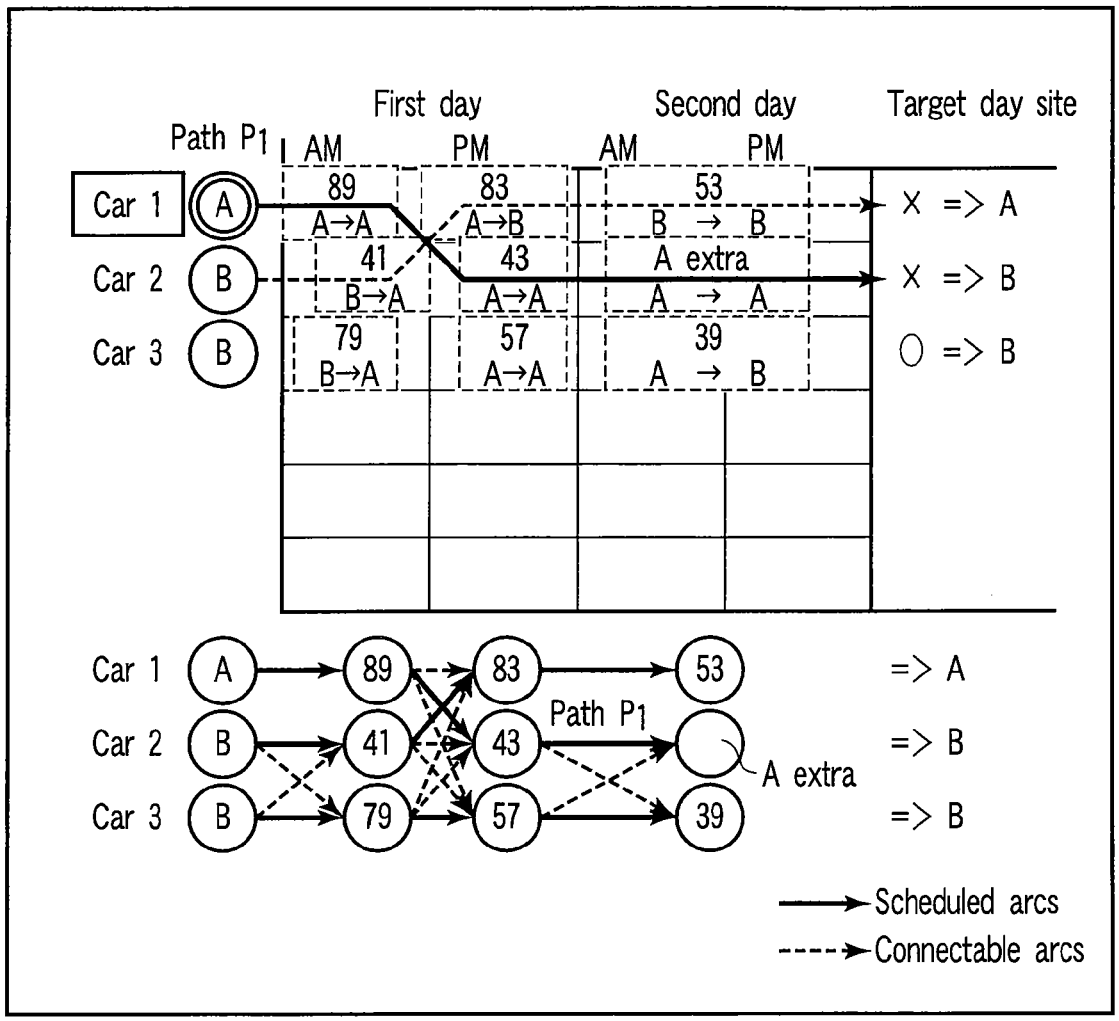
FIG. 19 is a view showing a case in which a path $P_1$ starting from car 1 in FIG. 18 is found.
Figure 20:
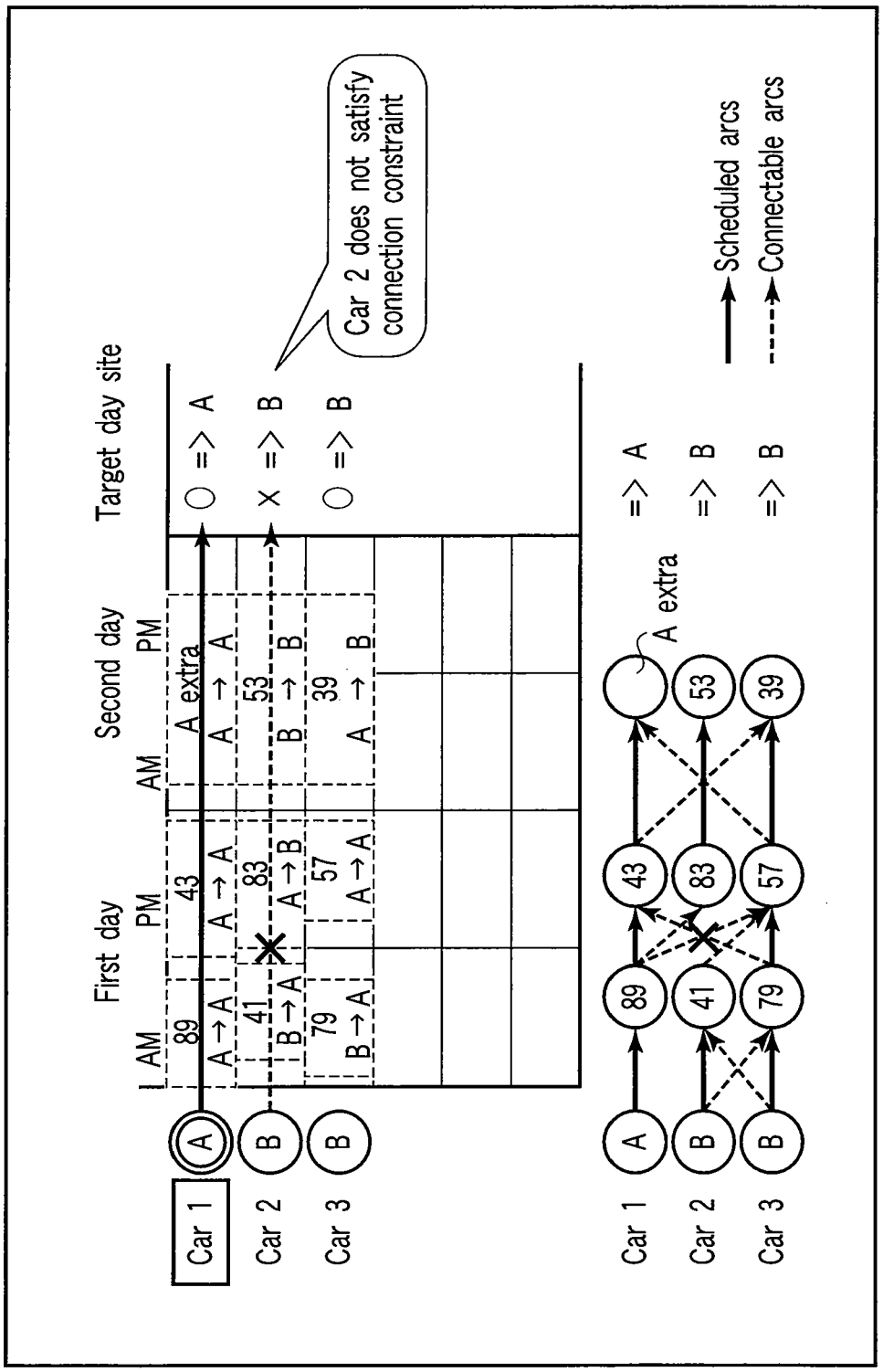
FIG. 20 is a view showing a case in which exchange is done based on the path $P_1$ in FIG. 19.

First, when k=1, a path having distance 1 and starting from the node A that is the 0th day node of car 1 is searched. For example, path $p_1=A=89=43=A$ (extra) is obtained (FIG. 19). The path $p_1$ satisfies both the connection constraints and the target day constraint of car 1. Hence, the process advances to Step 1 in FIG. 17 to execute exchanges based on the path $p_1$. An assignment graph shown in FIG. 20 is obtained.

Next, the assignment graph is checked. Operations 41 and 83 of car 2 are not connectable (no connectable arc is present) and do not satisfy the connection constraints (NO in step S1702). Hence, the exchanges based on the path $p_1$ are reset (Step 2 in FIG. 17), and the processing of the next path starts. Since no path whose number of times of exchange is 1 satisfies the connection constraints and the target day constraint, k=2 is set.

Figure 21:
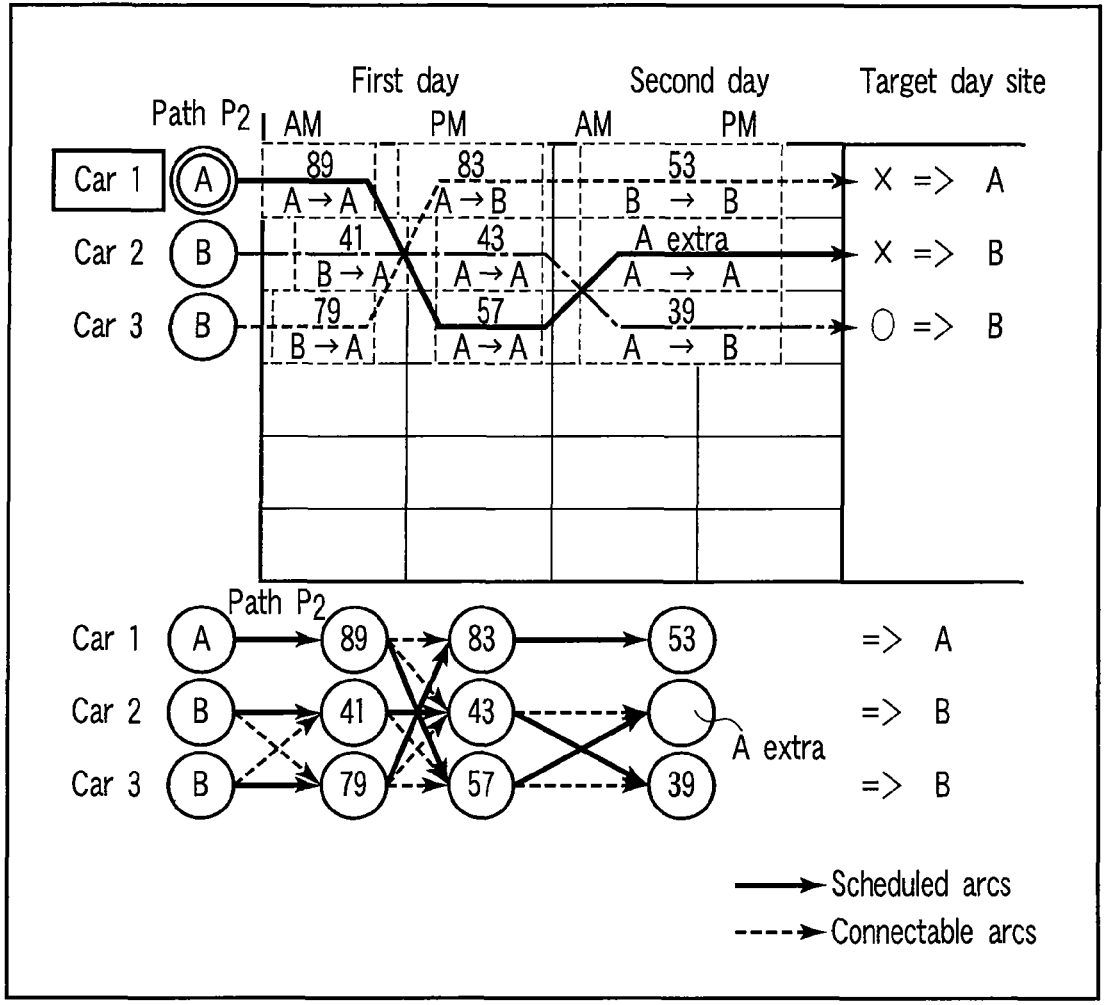
FIG. 21 is a view showing a case in which a path $P_2$ starting from car 1 in FIG. 18 is found.
Figure 22:
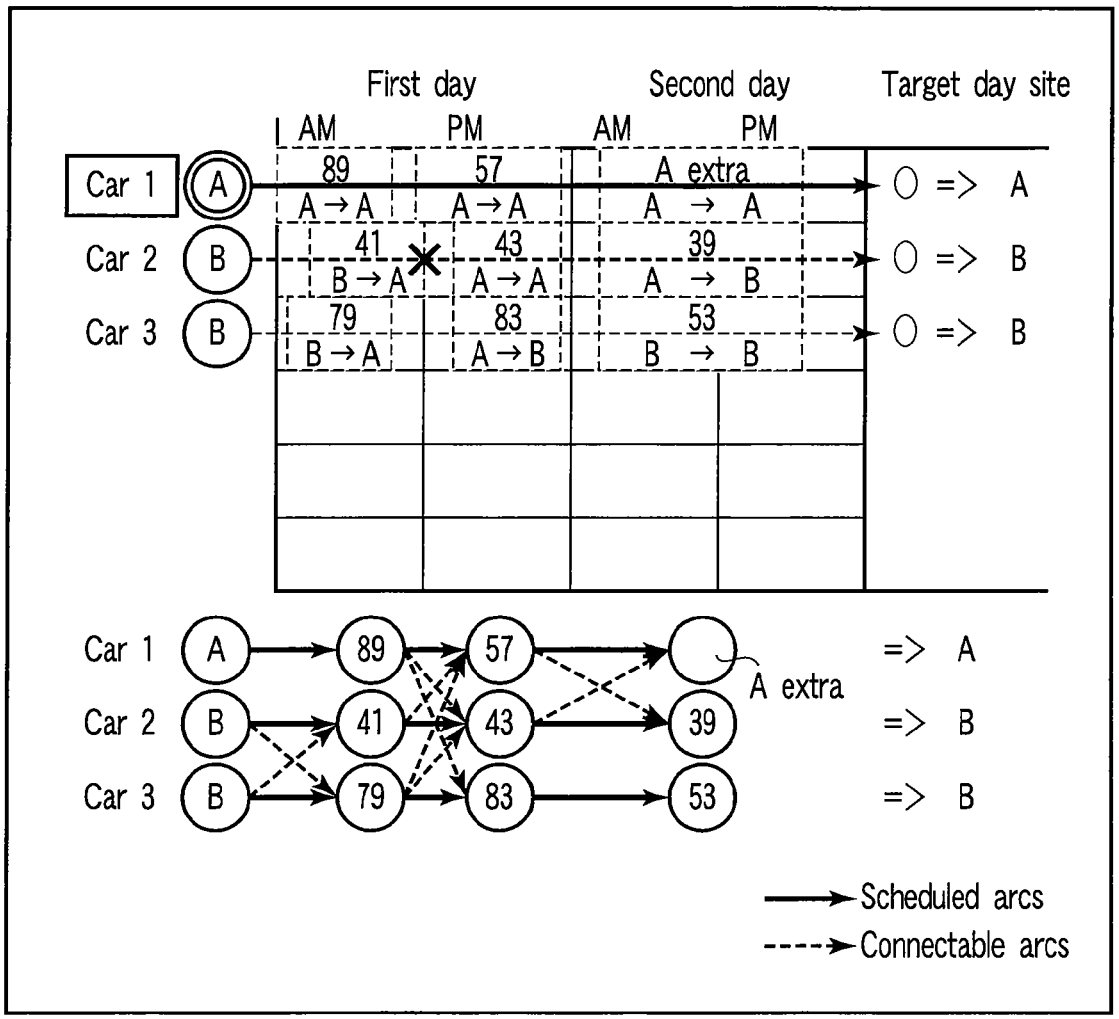
FIG. 22 is a view showing a case in which exchange is done based on the path $P_2$ in FIG. 21.

When k=2, a path having distance 2 and starting from the node A that is the 0th day node of car 1 is searched. For example, path $p_2=A\rightarrow 89\rightarrow 57\rightarrow A$ (extra) is obtained (FIG. 21). The path $p_2$ satisfies both the connection constraints and the target day constraint of car 1. Hence, the process advances to step S1701 to execute exchanges based on the path $p_2$. An assignment graph shown in FIG. 22 is obtained.

Next, the assignment graph is checked. Since both cars 2 and 3 satisfy the connection constraints and the target day constraints (YES in step S1702), backtrack succeeds.

Hence, the backtrack search sequence (FIG. 17) ends, and the process advances to step S1005 of the sequence shown in FIG. 10 again. In this case, since all cars satisfy the target day constraints (NO in step S1005), the backtrack search is not executed. Since scheduling up to the target day is completed (m==n (=2)), the loop ends, and scheduling ends.

According to the above-described first embodiment, all operation nodes included in each day are assigned to cars such that the connection constraints are satisfied. For a car which does not satisfy the target day constraint, all combinations of operation nodes are searched. This allows to automatically create, in a short time, a car roster which satisfies the constraints of the problem of rescheduling which satisfies the connection constraints and the target day constraints.

Second Embodiment

In this embodiment, exchanges except those for the initial car in a backtrack search are also executed in rescheduling. A rolling stock scheduling apparatus according to the second embodiment is the same as in the first embodiment except several points of the operation.

Control Sequence of Second Embodiment

An example of the operation of the rolling stock scheduling apparatus according to the second embodiment will be described first with reference to FIG. 23. The control sequence of the second embodiment is the same as in the flowchart of the first embodiment (FIG. 10) except that the backtrack search sequence in FIG. 17 changes to that in FIG. 23. The backtrack search according to the second embodiment will be described below in detail with reference to the flowchart in FIG. 23.

Figure 23:
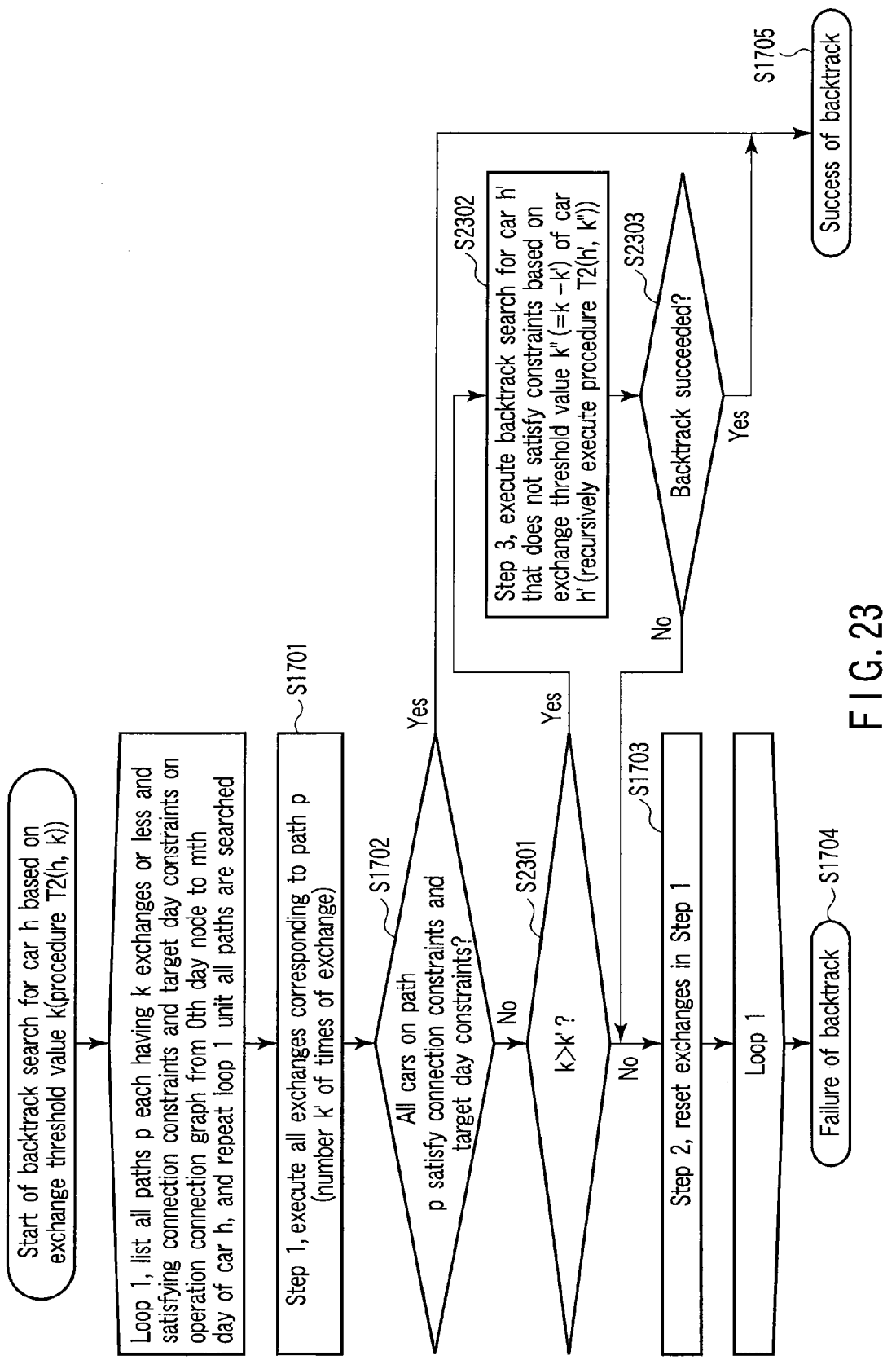
FIG. 23 is a flowchart illustrating an example of the operation of the backtrack search unit shown in FIG. 9 according to the second embodiment.

The flowchart in FIG. 23 is different from that in FIG. 17 of the first embodiment only in that steps S2301, S2302, and S2303 are inserted between steps S1701 and S1703. More specifically, in the second embodiment, after exchanges based on a path p (number of times of exchange=k') satisfying constraints are executed, if a car h2 that does not satisfy the connection constraints or the target day constraint exists, and k>k' (YES in step S2301), a procedure T2 itself is executed (recursively) from the car h2 by setting the exchange threshold value to k" (=k−k') (step S2302), thereby determining whether the backtrack will succeed (step S2303).

In this case, a car h does not satisfy the constraints. Since the path p that satisfies the constraints require at least one exchange, k'>0 always holds. Since k>k" (=k−k') always holds, the exchange threshold value (k→k" . . . ) decreases every time recursive execution is done. For this reason, the depth of recursive execution is equal to or less than the exchange threshold value k when the procedure T2 has been executed first. This guarantees that the procedure T2 always stops.

Detailed Example of Second Embodiment

Figure 24:
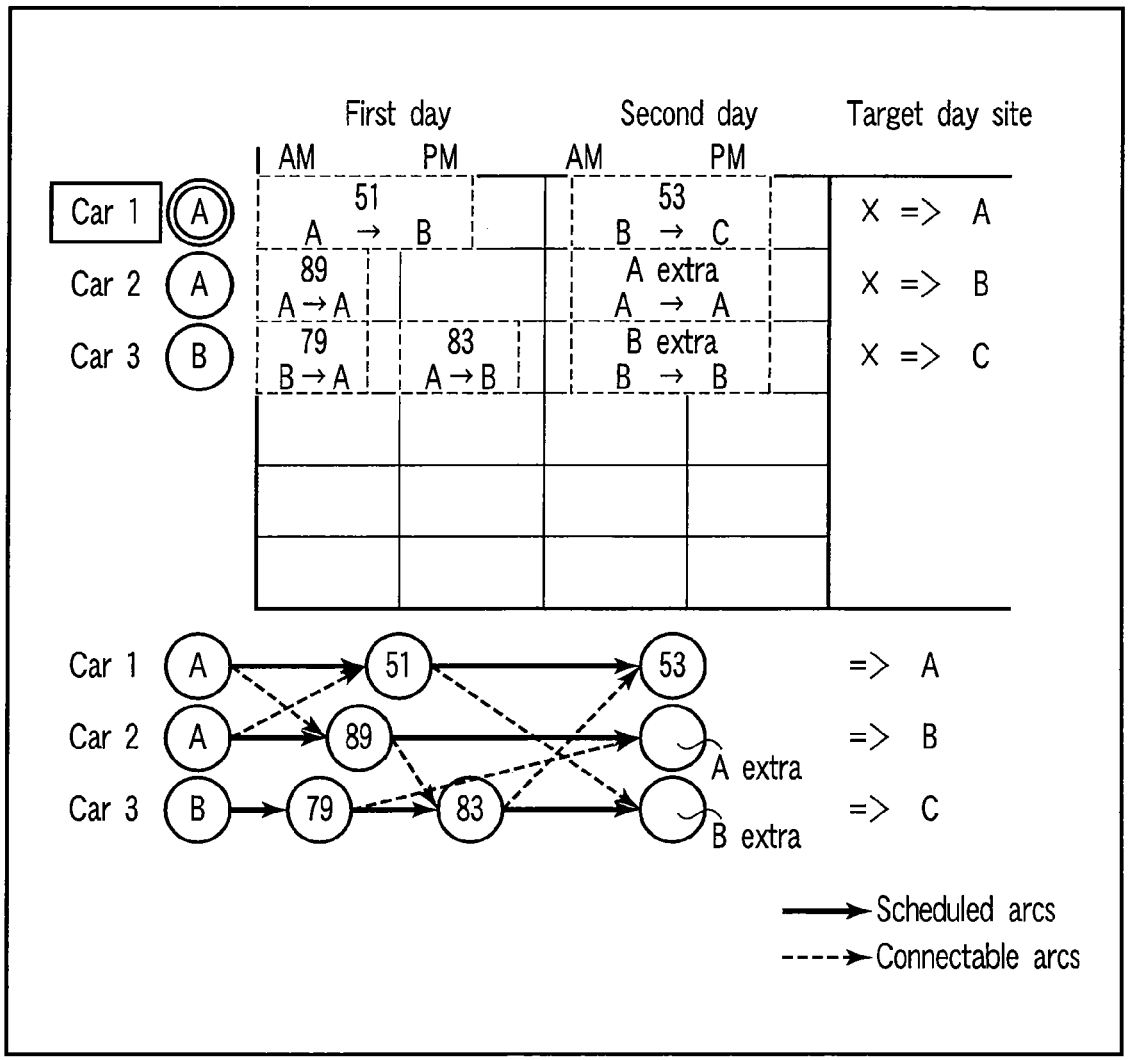
FIG. 24 is a view showing an application example of the second embodiment.

The backtrack search of the second embodiment will be explained using a detailed example (FIG. 24). Note that initial day=1, target day n=2, and exchange threshold value max=2.

Assume that an assignment graph shown in FIG. 24 is obtained by greedy assignment up to the second day according to the flowchart in FIG. 10. In this assignment graph, since car 1 does not satisfy the target day constraint, h=1 is set, and the process advances to the backtrack search sequence (FIG. 23). In the following explanation, assume that after backtrack has failed for the exchange threshold value k=1 in the first execution of the backtrack search T2, the exchange threshold value k of the backtrack search T2 is set to 2.

Figure 25:
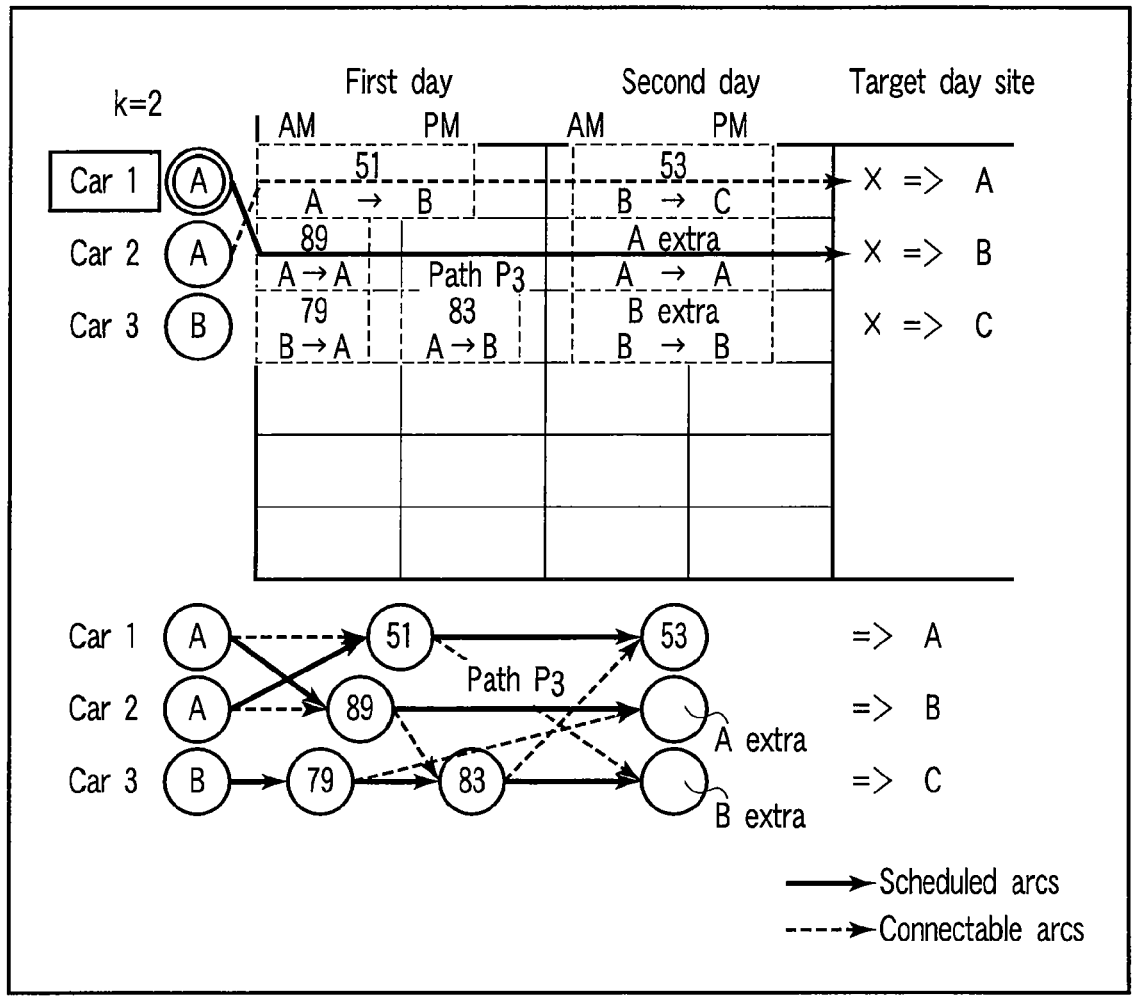
FIG. 25 is a view showing a case in which a path $P_3$ starting from car 1 in FIG. 24 is found.

In the backtrack search, first, a path having distance 2 and starting from a node A that is the 0th day node of car 1 is searched. For example, path $p_3$=A→89→A (extra) (number k' of times of exchange=1) is obtained (FIG. 25). The path $p_3$ satisfies both the connection constraints and the target day constraint of car 1. Hence, the process advances to Step 1 in FIG. 23 to execute exchanges based on the path $p_3$. An assignment graph shown in FIG. 26 is obtained.

Next, the assignment graph is checked. Since car 2 does not satisfy the target day constraint (NO in step S1702 of FIG. 23), and k>k' (2>1) (YES in step S2301 of FIG. 23), the process advances to Step 3 in FIG. 23 to recursively execute the backtrack search T2 (h', k") corresponding to the exchange threshold value k" (=2−1) of a car h' (=2).

Figure 28:
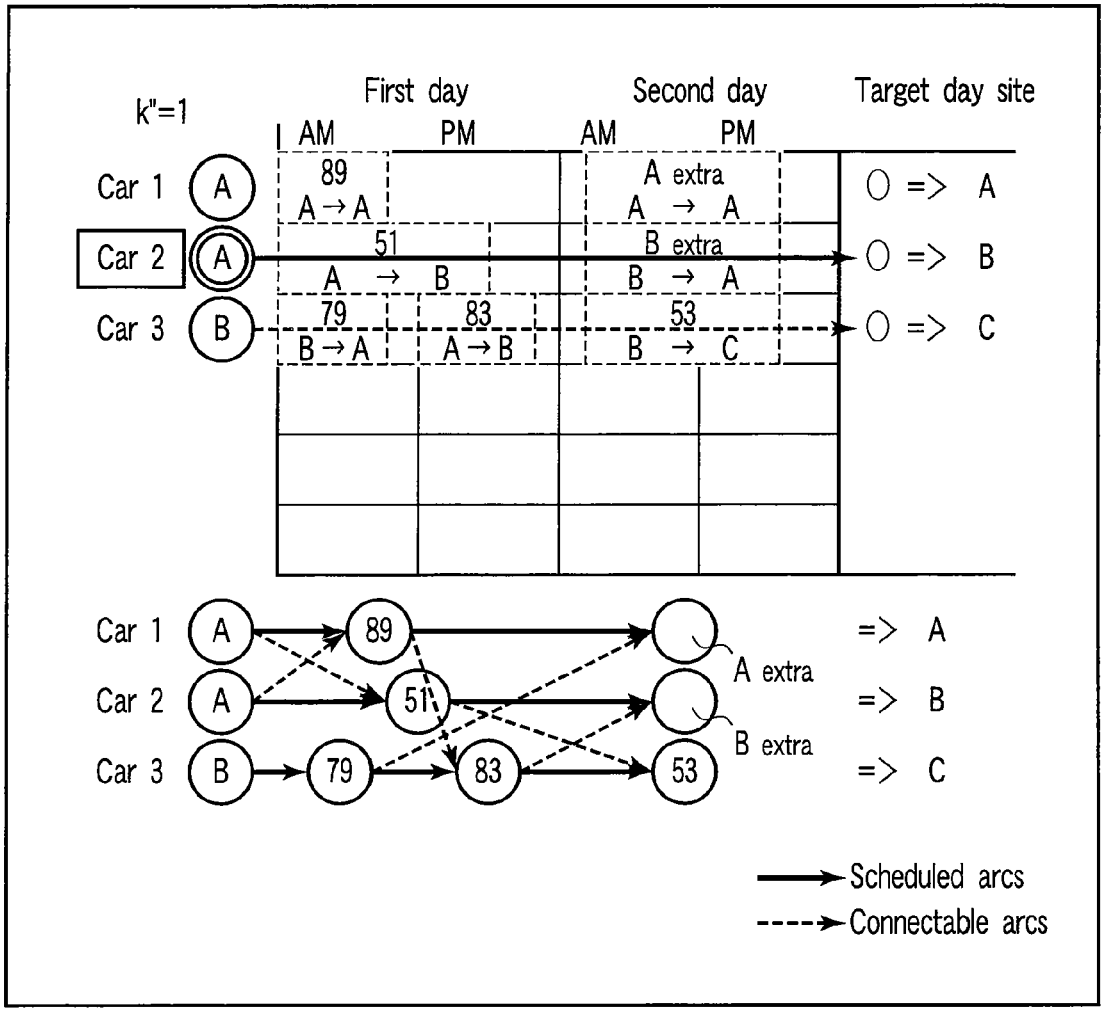
FIG. 28 is a view showing a case in which exchange is done based on a path $P_4$ in FIG. 27.
Figure 29:
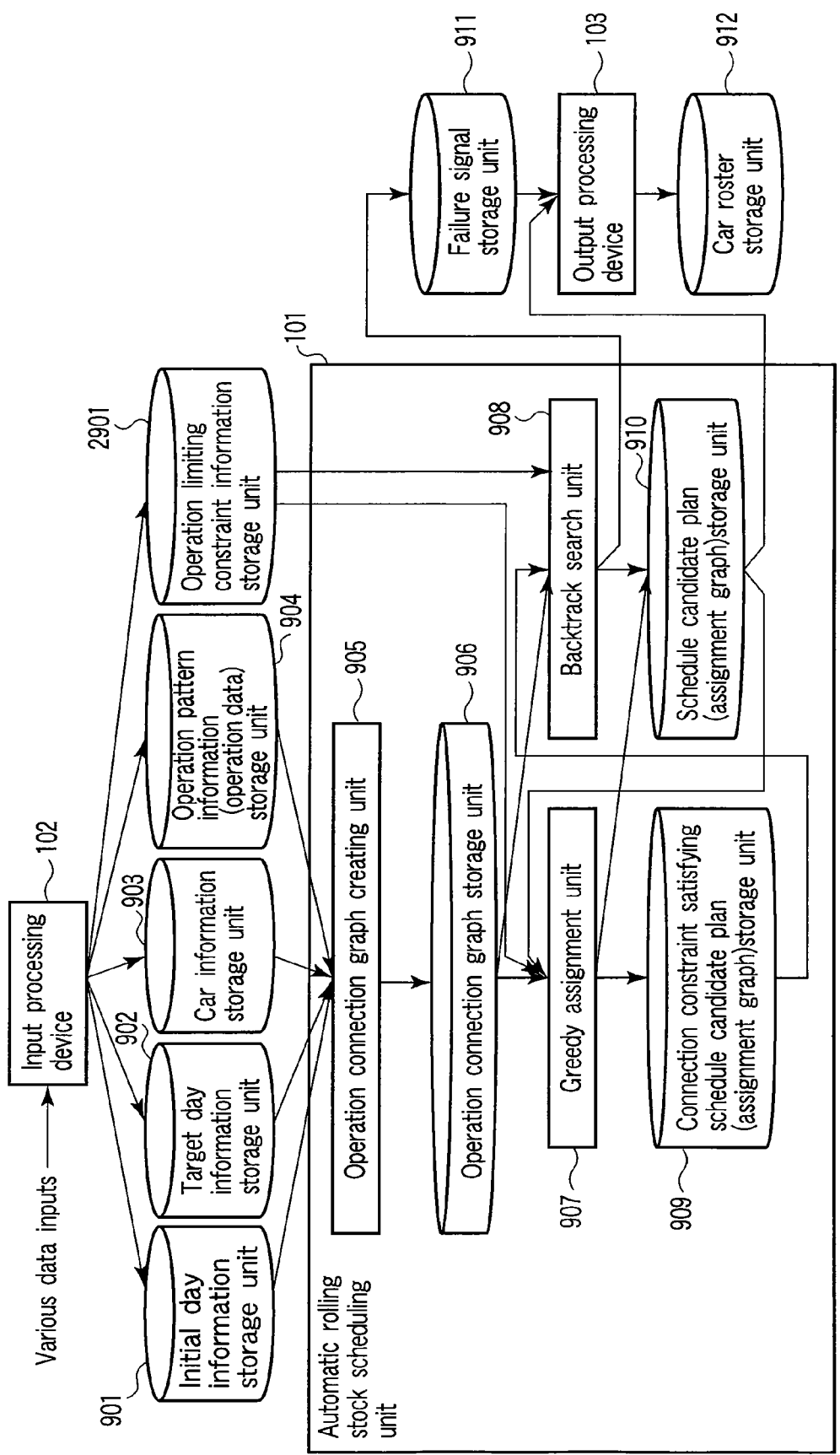
FIG. 29 is a block diagram of a rolling stock scheduling apparatus according to the third embodiment.

Next, the backtrack search of the exchange threshold value 1 is executed from the car h=2. For example, path $p_4$=A→51→B (extra) (number of times of exchange=1) as shown in FIG. 27 is obtained. The path $p_4$ satisfies both the connection constraints and the target day constraint of car 1. Hence, the process advances to Step 1 in FIG. 23 to execute exchanges based on the path $p_4$. An assignment graph shown in FIG. 28 is obtained.

Next, the assignment graph is checked. Since both cars 2 and 3 satisfy the connection constraints and the target day constraints, backtrack succeeds. Hence, the backtrack search sequence before recursive execution ends, and the process advances to step S1005 again. In this case, since all cars satisfy the target day constraints (NO in step S1005), the backtrack is not executed. Since scheduling up to the target day is completed (m==n (=2)), the loop ends, and scheduling ends.

According to the above-described second embodiment, since all solutions within the number k of times of exchange can be checked, a car roster can automatically be created in a short time at a higher possibility than in the first embodiment.

Third Embodiment

In this embodiment, operation limiting constraint information 125 is added as information to be input to an automatic rolling stock scheduling unit 101.

A rolling stock scheduling apparatus according to the third embodiment has an operation limiting constraint information storage unit 2901 in addition to the device parts of the rolling stock scheduling apparatus of the first embodiment. The remaining components are the same as in the first embodiment.

The operation limiting constraint information storage unit 2901 stores the operation limiting constraint information 125 and provides it to a greedy assignment unit 907 and a backtrack search unit 908. The operation limiting constraint information 125 is used to check operation limiting constraints.

Control Sequence of Third Embodiment

An example of the operation of the rolling stock scheduling apparatus according to the third embodiment will be described first with reference to FIG. 30. The control sequence of the third embodiment is the same as in the flowchart of the second embodiment except that not only the target day constraints but also the operation limiting constraints are checked in step S1005 of the flowchart in FIG. 10, and the backtrack search sequence in FIG. 23 changes to that in FIG. 30. The backtrack search according to the third embodiment will be described below in detail with reference to the flowchart in FIG. 30.

Figure 30:
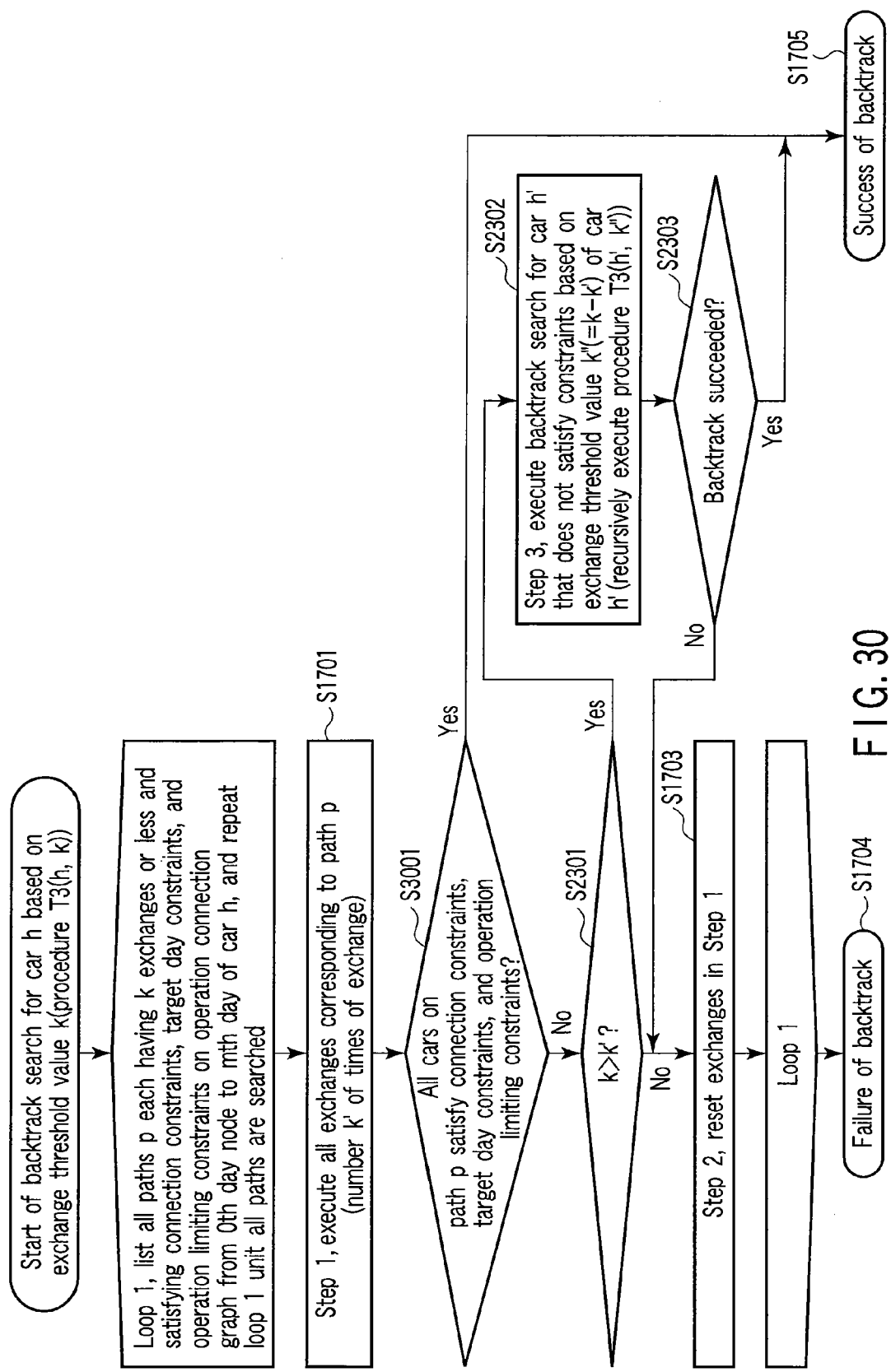
FIG. 30 is a flowchart illustrating an example of the operation of the backtrack search unit shown in FIG. 9 according to the third embodiment.

The flowchart in FIG. 30 is different from that in FIG. 23 only in that the constraints to be satisfied in loop 1 and step S3001 include the operation limiting constraints in addition to the connection constraints and the target day constraints.

Detailed Example of Third Embodiment

Figure 31:
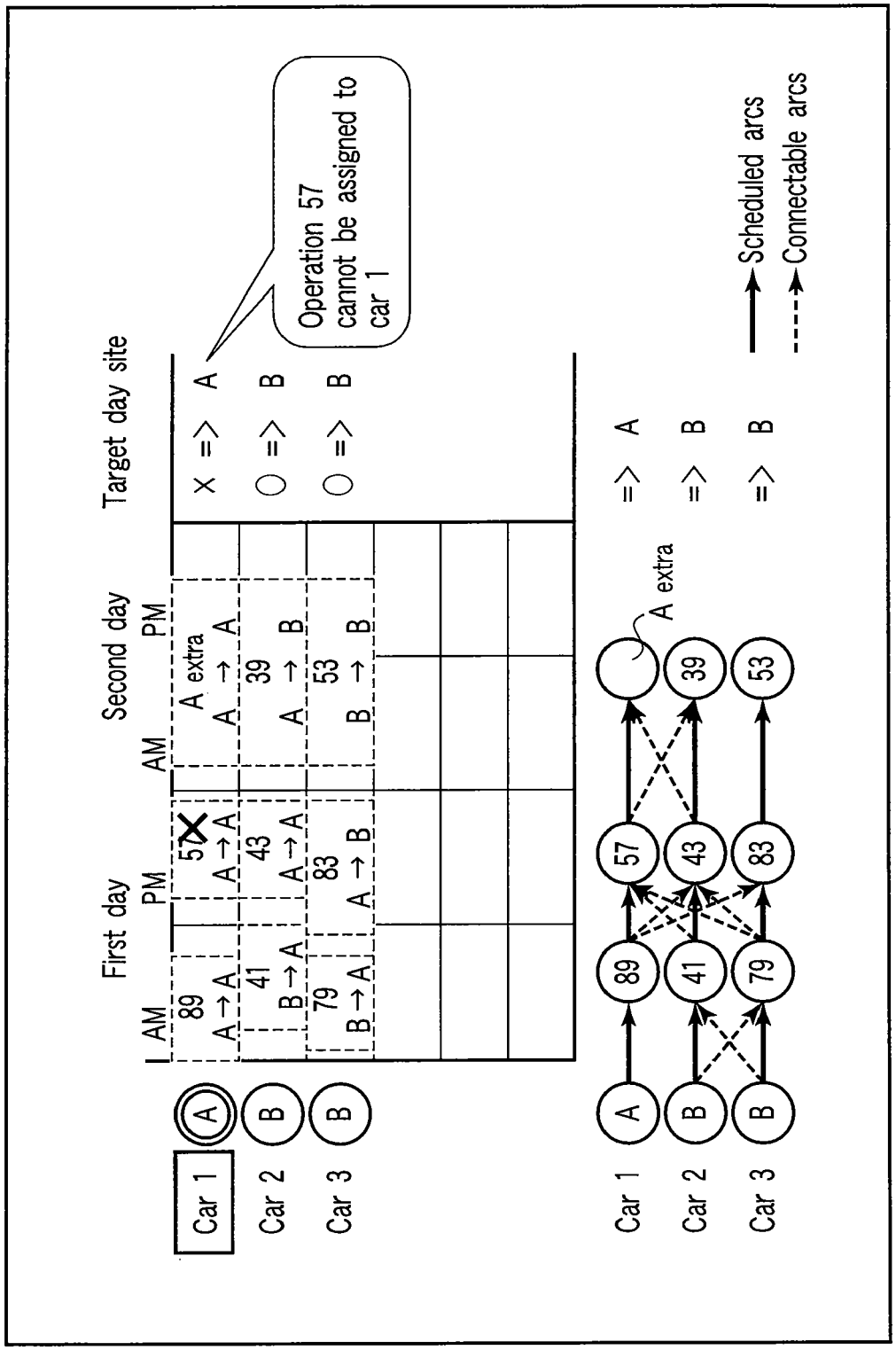
FIG. 31 is a view showing an application example of the third embodiment.

The backtrack search of the third embodiment will be explained using a detailed example (FIG. 31). Note that initial day=1, target day n=2, and exchange threshold value max=2.

Additionally, assume that there is an operation limiting constraint that operation 57 must not be assigned for the first day of car 1.

Figure 32:
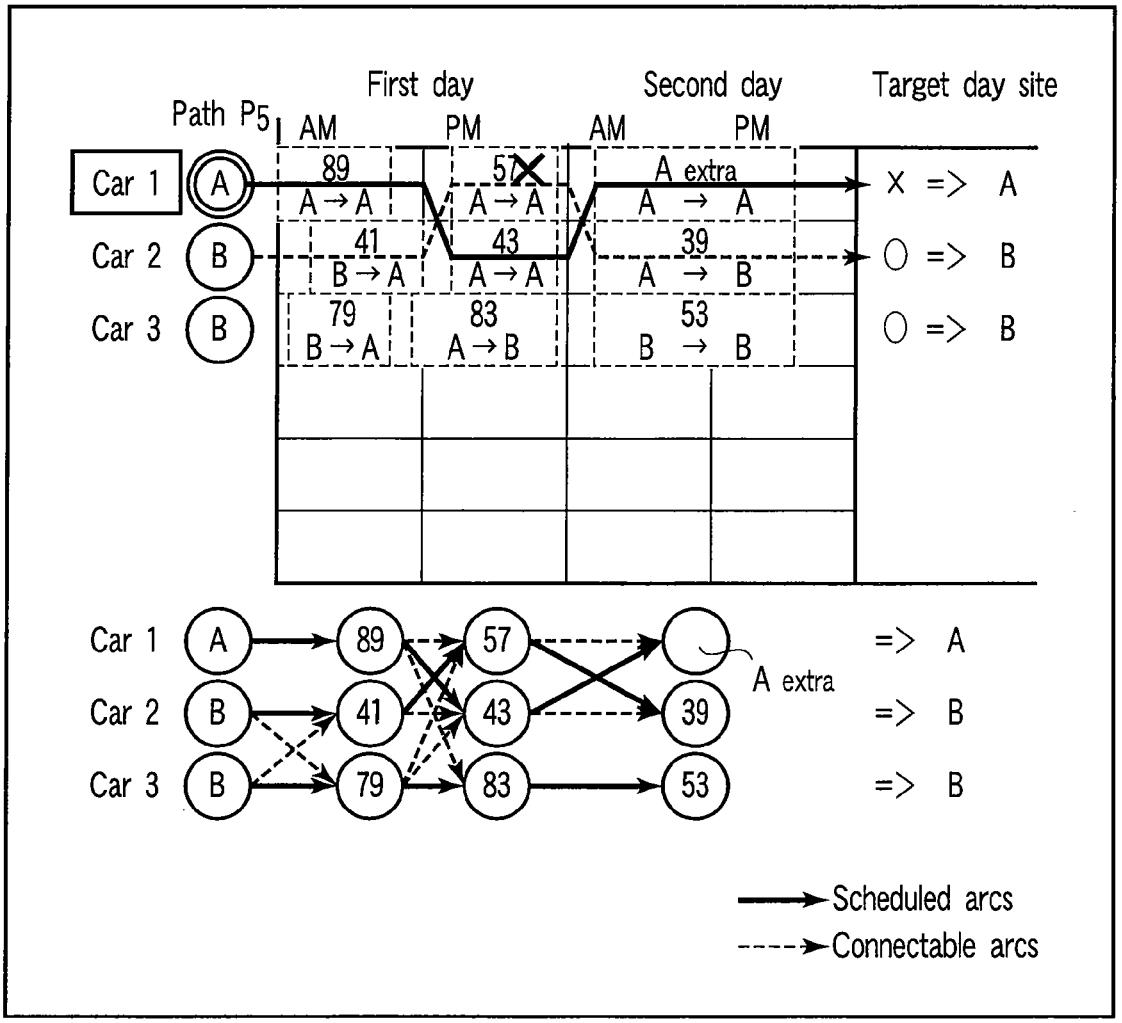
FIG. 32 is a view showing a case in which a path $P_5$ starting from car 1 in FIG. 31 is found.
Figure 33:
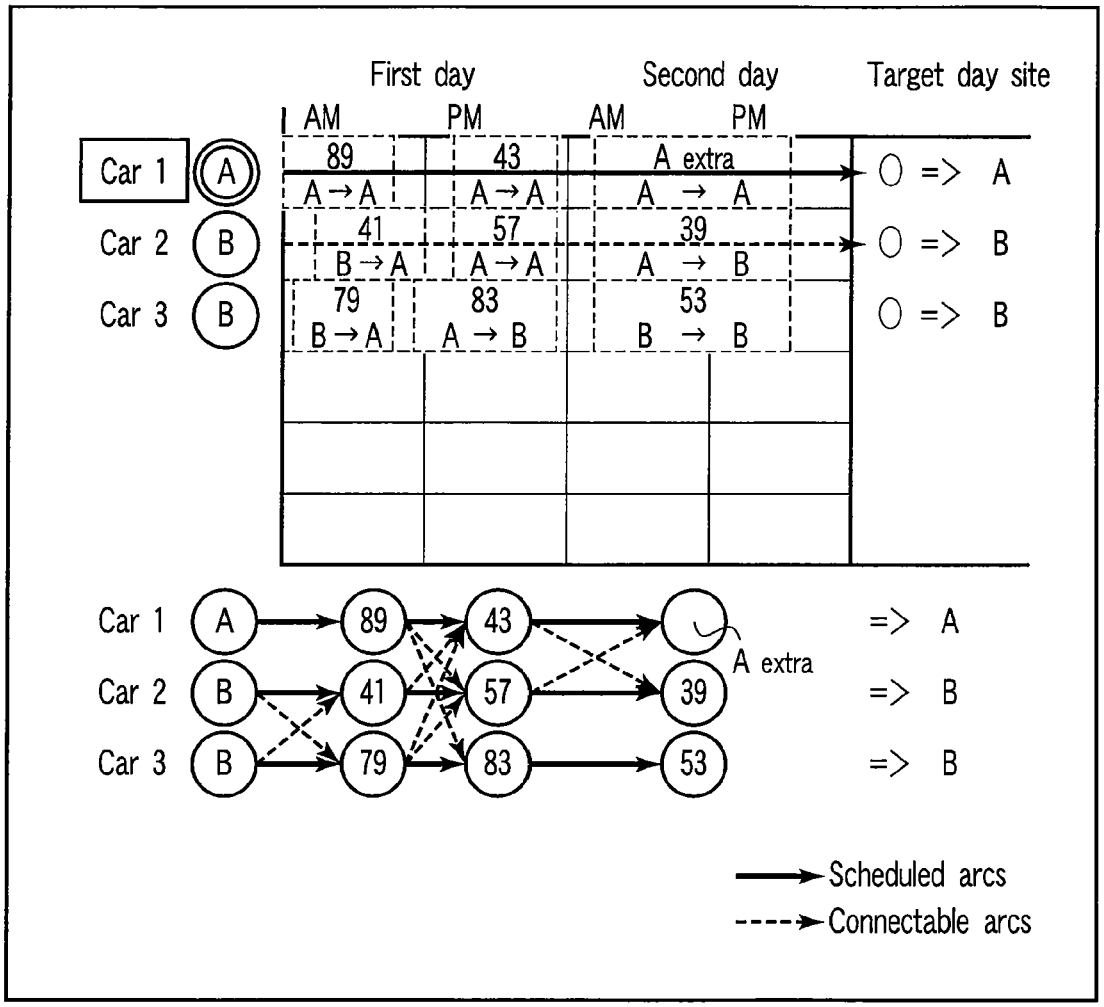
FIG. 33 is a view showing a case in which exchange is done based on the path $P_5$ in FIG. 32.

Assume that an assignment graph shown in FIG. 31 is obtained by greedy assignment up to the second day according to the flowchart in FIG. 10. In this assignment graph, since operation 57 is assigned for the first day of car 1, and the operation limiting constraint is not satisfied, h=1 is set, and the process advances to the backtrack search sequence (FIG. 30). In the following explanation, k=2 is set in consideration of the situation after the search for k=1. In the backtrack search, first, a path having distance 2 and starting from a node A that is the 0th day node of car 1 is searched. For example, path $p_5$=A→89→43→A (extra) (number k' of times of exchange=2) is obtained (FIG. 32). The path $p_5$ satisfies both the connection constraints and the target day constraint of car 1. Hence, the process advances to Step 1 in FIG. 30 to execute exchanges based on the path $p_5$. A schedule shown in FIG. 33 is obtained.

Next, the assignment graph is checked. Since both cars 1 and 2 satisfy the connection constraints, the target day constraints, and the operation limiting constraints, backtrack succeeds. Hence, the backtrack search sequence (FIG. 23) ends, and the process advances to step S1005 again. In this case, since all cars satisfy the target day constraints (NO in step S1005), the backtrack is not executed. Since scheduling up to the target day is completed (m==n (=2)), the loop ends, and scheduling ends.

According to the above-described third embodiment, it is possible to automatically create, in a shorter time, a car roster which satisfies the constraints of the problem of rescheduling which satisfies the operation limiting constraints.

<Schemes Associated with Extra Node>

In the backtrack search of the first to third embodiments, an extra node is regarded to be the same as a normal operation. If an assignment schedule that ensures extra cars at maximum is created by greedy assignment, only an assignment schedule that ensures extra cars at maximum is obtained by the subsequent backtrack search. Consequently, it is impossible to implement an assignment having the number of extra cars smaller than the maximum number by one, as shown on the upper right side of FIG. 34.

Generally, it is often supposed to be important to ensure extra cars at maximum, as described above. In some cases, however, an assignment schedule that does not ensure extra cars at maximum may be desirable in consideration of the balance to other constraints. In such a case, the definitions of the attributes of an extra node associated with a site B are set in the following way in advance (the definition of the arrival site is different from that described above).

Figure 34:
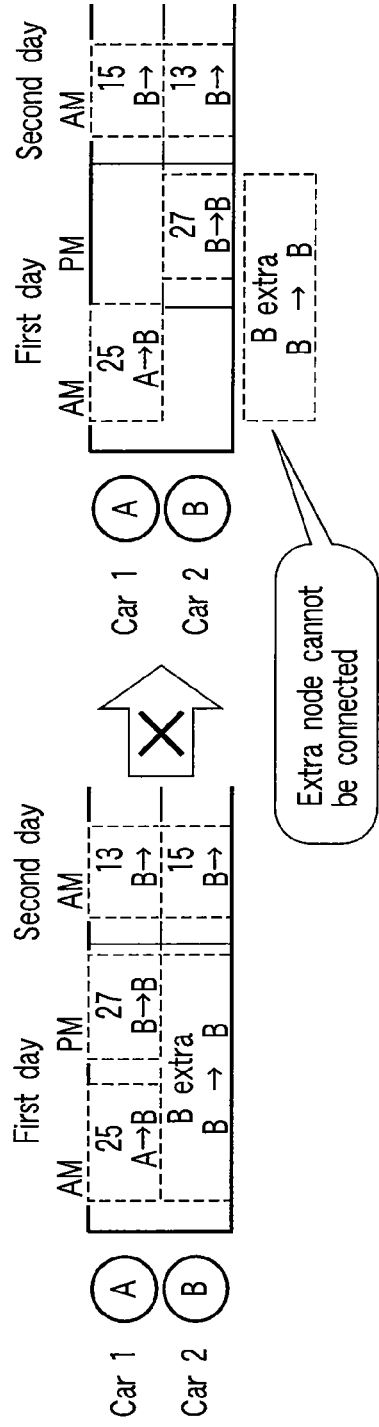
FIG. 34 is a view for explaining implementation of assignment having the number of extra cars smaller than the maximum number by one.
Figure 34:
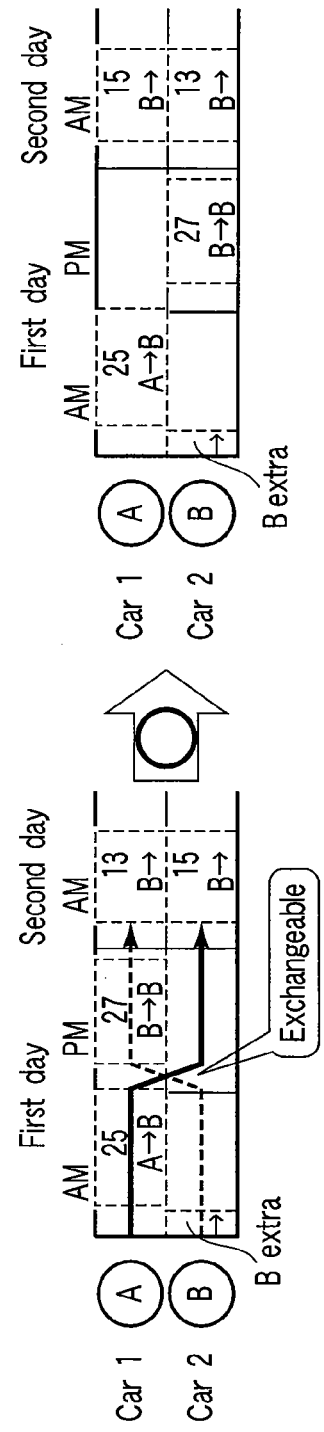

Departure site: B
Arrival site: B
Departure time: sufficiently early time
Arrival time: sufficiently early time These definitions makes the extra node connectable to all operation nodes starting from the site B on the day of interest. Hence, an exchange as shown on the lower side of FIG. 34 is possible, and an assignment schedule including extra cars not at maximum (having the number of extra cars smaller than the maximum number by one in this case) can be obtained.

According to the above-described embodiments, all operation nodes included in each day are assigned to cars such that the connection constraints are satisfied. For a car which does not satisfy the target day constraint (and the operation limiting constraints), all combinations of operation nodes are searched. This allows to automatically create a car roster which satisfies the given constraints in a short time.

As an advantage of the embodiments, various kinds of constraints such as the limiting constraints of operable cars, the inspection and cleaning constraints of each car, and the unavailable constraints of each car for, e.g., shop-in can systematically be processed using operation limiting constraints that is highly generalized expression. Even when a constraint is added or changed in actual operation, the constraint processing engine itself need not be changed. It is only necessary to change the operation limiting constraint generation method. This reduces the maintenance cost.

In the above-described embodiments, fundamentally, since a brute-force based search method is adopted, no parameters to control the search method itself exist. It is therefore possible to reduce the cost of parameter tuning every time the application target route or operation condition changes.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A rolling stock scheduling apparatus comprising:
   a processor;
   a creation unit configured to create an operation connection graph for each car from an initial day to a target day, the graph including nodes representing initial day sites, target day sites, and first operations, the first operations being defined by a departure time, a departure site, an arrival time, and an arrival site, the graph also including arcs each of which indicates nodes' connectability based on the departure site, the arrival site, the departure time and the arrival time;
   a setting unit configured to set a plurality of first paths that connect second operations for each car on each day sequentially from the initial day to the target day, the second operations being included in the first operations;
   an exchange unit configured to: determine that there is a first car which does not exist at the target day site on the target day; and exchange each arc so that all cars exist at target day sites on the target day; and
   an output unit configured to: determine that second paths on which all the cars exist at the target day sites on the target day are found; and output third operations corresponding to each of the second paths as a car operation, the second paths being set by the setting unit.

2. The apparatus according to claim 1, wherein the exchange unit sequentially sets, from 1, number of times of exchange representing number of arcs exchanged for each path, and exchanges the arcs up to a threshold value of the number of times of exchange to make all cars corresponding to all paths exist at the target day sites on the target day.

3. The apparatus according to claim 2, wherein the exchange unit sets a number obtained by subtracting the number of times of exchange from the threshold value as a new threshold value for a third car which does not exist at the target day site on the target day, and exchanges the arcs up to the new threshold value.

4. A rolling stock scheduling method comprising:
   creating an operation connection graph for each car from an initial day to a target day, the graph including nodes representing initial day sites, target day sites, and first operations, the first operations being defined by a departure time, a departure site, an arrival time, and an arrival site, the graph also including arcs each of which indicates nodes' connectability based on the departure site, the arrival site, the departure time, and the arrival time;

setting, by a computer system, a plurality of set first paths that connect second operations for each car on each day sequentially from the initial day to the target day, the second operations being included in the first operations;

determining that there is a first car which does not exist at the target day site on the target day;

exchanging each arc so that all cars exist at target day sites on the target day;

determining that second paths on which all the cars exist at the target day sites on the target day are found; and outputting third operations corresponding to each of the second paths as a car operation, each of the second paths being set.

5. The method according to claim 4, wherein exchanging each arc sequentially sets, from 1, number of times of exchange representing number of arcs exchanged for each path, and exchanges the arcs up to a threshold value of the number of times of exchange to make all cars corresponding to all paths exist at the target day sites on the target day.

6. The method according to claim 5, wherein exchanging each arc sets a number obtained by subtracting the number of times of exchange from the threshold value as a new threshold value for a third car which does not exist at the target day site on the target day, and exchanges the arcs up to the new threshold value.

* * * * *